(12) United States Patent
Losey et al.

(10) Patent No.: US 6,932,951 B1
(45) Date of Patent: Aug. 23, 2005

(54) MICROFABRICATED CHEMICAL REACTOR

(75) Inventors: Matthew W. Losey, Boston, MA (US);
Klavs F. Jensen, Lexington, MA (US);
Martin A. Schmidt, Reading, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 683 days.

(21) Appl. No.: 09/699,873

(22) Filed: Oct. 30, 2000

Related U.S. Application Data

(60) Provisional application No. 60/162,621, filed on Oct. 29, 1999.

(51) Int. Cl.⁷ .............................. B01J 35/02; B01J 8/02
(52) U.S. Cl. ...................................... 422/211; 422/213
(58) Field of Search ...................... 422/211, 213, 198, 422/200

(56) References Cited

U.S. PATENT DOCUMENTS

| | | | |
|---|---|---|---|
| 3,357,916 A | * | 12/1967 | Smith ................... 208/120.05 |
| 4,908,112 A | | 3/1990 | Pace |
| 5,385,709 A | | 1/1995 | Wise et al. |
| 5,534,328 A | * | 7/1996 | Ashmead et al. ........... 428/166 |
| 5,589,136 A | | 12/1996 | Northrup et al. |
| 5,595,712 A | | 1/1997 | Harbster et al. |
| 5,639,423 A | | 6/1997 | Northrup et al. |
| 5,646,039 A | | 7/1997 | Northrup et al. |
| 5,674,742 A | | 10/1997 | Northrup et al. |
| 5,690,763 A | | 11/1997 | Ashmead et al. |
| 5,811,062 A | | 9/1998 | Wegeng et al. |
| 5,843,385 A | | 12/1998 | Dugan |
| 5,863,502 A | | 1/1999 | Southgate et al. |
| 5,882,496 A | | 3/1999 | Northrup et al. |
| 5,932,315 A | | 8/1999 | Lum et al. |
| 5,961,930 A | | 10/1999 | Chatterjee et al. |
| 5,961,932 A | | 10/1999 | Ghosh et al. |
| 5,965,092 A | | 10/1999 | Chatterjee et al. |
| 5,965,237 A | | 10/1999 | Bruin et al. |
| 6,521,181 B1 | * | 2/2003 | Northrup et al. .............. 422/52 |
| 6,749,814 B1 | * | 6/2004 | Bergh et al. ................. 422/130 |

FOREIGN PATENT DOCUMENTS

WO        WO 99/44736        9/1999

* cited by examiner

*Primary Examiner*—M. Alexandra Elve
(74) *Attorney, Agent, or Firm*—Kirkpatrick & Lockhart Nicholson Graham LLP

(57) ABSTRACT

A microfabricated chemical reactor includes a plurality of lamina, an inlet port formed in at least one of the lamina, and an outlet port formed in at least one of the lamina. A continuous channel is formed in at least one of the lamina and provides fluid communication between the inlet port and the outlet port. In one configuration of the microfabricated chemical reactor, the reactor includes a particle filter disposed in the continuous channel and formed by one of the lamina, wherein the particle filter restricts flow through the continuous channel and retains catalyst or other particles within the continuous channel.

36 Claims, 28 Drawing Sheets

$$k_L a = 0.45 * \frac{D_{AL}}{d_p^2} [Re_L^{4/5} \cdot We_L^{1/5} \cdot Sc_L^{1/2} \cdot X_G^{1/2} \cdot \alpha]^{1.3}$$

FIGURE 10b

$$k_L a = 0.12 \cdot E_l^{1/2}$$

$$E_l^{1/2} = \frac{\Delta P}{\Delta L} \cdot v_L$$

FIGURE 10c

$$\frac{\Delta P}{L} \propto \frac{\mu \cdot Q}{D_p^2 \cdot A_s} \cdot \frac{(1-\varepsilon)^2}{\varepsilon^3}$$

$\Delta P_1 = \Delta P_2$
(For Constant $\tau$)

MICROFABRICATED CHEMICAL REACTOR

CROSS-REFERENCE TO RELATED APPLICATIONS

This application claims priority under 35 U.S.C. § 119(e) from U.S. Provisional Application Ser. No. 60/162,621, filed Oct. 29, 1999.

FEDERALLY SPONSORED RESEARCH

This invention was made with support under DARPA Contract No. F30602-97-01 00.

TECHNICAL FIELD AND INDUSTRIAL APPLICABILITY OF THE INVENTION

The present invention relates to microfabricated chemical reactors. Microfabricated chemical reactors find particular application in conducting chemical synthesis, and such devices find particular application in conducting heterogeneous catalytic reactions involving gas and liquid reactants.

DESCRIPTION OF THE INVENTION BACKGROUND

Process miniaturization and micro-reactor technology provide opportunities for improving chemical processing and provide improved process control in chemical synthesis. Smaller scale chemical reactors may allow safer and more efficient investigation of the kinetics of chemical reactions. Recent work has investigated the production of chemical processing equipment on silicon wafers using microfabrication techniques. Microfabrication techniques involving photolithography, deep-reactive-ion etching, thin-film growth and deposition, and multiple wafer bonding provide the opportunity to design and fabricate novel chemical reactors, and certain simple chemical reactor systems have been produced incorporating various unit operations.

Chemical synthesis may be optimized by precise control of the parameters that determine the overall efficiency of the reaction. These parameters include, for example, reaction temperature, pressure, degree of mixing of reactants, rate of diffusion of the reactants to a catalytic site, and formation of byproducts by inadvertent exposure to products or other unintended compounds. Certain chemical reactions occur rapidly and, therefore, are particularly difficult to control with precision. Inadequate mixing may lead to regions of the reaction mixture including non-stoichiometric portions of reactants, reaction hot spots, reaction dead spots due to channeling, formation of unwanted byproducts, or production of products other than those desired.

The above problems may be particularly evident when reactions are carried out on a large scale, with relatively large volumes of reaction components. Typical industrial chemical processing equipment is designed to hold a relatively large volume of materials. The large size of these reactors makes controlling high rate chemical reactions especially difficult. Proper mixing of the components of the reaction is necessary to optimize reaction rates and overall reaction yields. Incomplete and inefficient mixing may also affect controlling the temperature of a reaction. Localized hot spots due to a high concentration of reactants typically lead to product degradation and by-product formation. In the case of a conventional tank reactor, for example, when reactants are introduced they are typically introduced into the reactor in separate inlet ports and then mixed together by agitation of the entire reactor contents. For chemical reactions that occur rapidly, the reaction will likely have occurred before adequate mixing has been accomplished. Under these conditions, undesired secondary reactions may occur which produce undesired byproducts, reduce the overall efficiency of the reaction, and create downstream purification problems.

The limitations of conventional industrial and laboratory reactor systems may be primarily attributed to the small surface to volume ratio present in the reactors. This ratio greatly reduces mixing efficiency, and uniform temperature control of the entire volume of chemical reactants is difficult. In recent years, an effort has been made to overcome these limitations. Micro-reactors have been fabricated using known methods of microfabrication developed in the computer chip manufacturing industry. Methods of microfabrication available for the production of micro-reactors typically include, but are not limited to, photolithographic and etching techniques. Such techniques typically are utilized in the formation of configurations on silicon wafers on which silicon dioxide, silicon nitride and similar thin films have been applied. Using these techniques, three-dimensional micro-machined devices may be produced having dimensions from one to over a hundred microns with submicron tolerances. Micro-machining methods have been used to produce miniature chemical reactors having significantly higher surface to volume ratios than their macro-scale counterparts. Although the high surface to volume ratios of miniature chemical reactors offer improvements in thermal management and mass transfer, designing reactors of this type also presents challenges resulting from greatly increased pressure drop across channels having dimensions that may be on the order of tens of microns. These pressure drop considerations result in increased energy costs and limitations on the overall production rate of the reactor.

In general, the performance of chemical synthesis is controlled by mass transport and thermal transport through the reaction medium. Especially in heterogeneous catalytic reactions, which include many industrially important chemical reactions, the diffusion rate of the reactants into the liquid, through the liquid, and onto the catalytic reaction site control the rate of reaction. As used herein, a heterogeneous catalytic reaction is one wherein the reaction of gaseous and/or liquid reactants is promoted by the presence of a solid catalyst.

Multi-phase industrial reactors operated continuously are usually classified according to their flow dynamics. As an example, in trickle bed reactors the free volume of the reactor not occupied by catalyst is predominantly the gas phase and the liquid phase forms a thin film on the catalyst pellet. Uneven flows can lead to incomplete utilization or local zones of varying reaction rate and heat transfer. Poor distribution of the fluids can thus lead to local "hot spots" which can decrease the reaction selectivity, reduce catalyst life, or lead to side reactions which may lead to dangerous uncontrollable side reactions. For example, hydrogenation reactions are exothermic and consequently thermal uniformity and adequate temperature control is a primary concern. In addition to losses in selectivity and decreased product yield, poor thermal management can decrease the life of a catalyst and further reduce the efficiency of a reactor. The associated flammability danger of oxidation reactions precludes the use of organic solvents or high concentrations of oxygen. In a micro-reactor, however, where the area of elevated temperatures due to exothermic reactions and reaction zone itself is confined to a small volume, more aggressive reaction conditions can be tolerated.

Micro-reactors may be produced having extremely low surface to volume ratios and such reactors, therefore, provide unique opportunities for reaction and chemical engineers to control transport phenomena to produce extremely efficient chemical reactors. In addition, by constructing reactors using silicon micro-machining methods, the opportunity to integrate a wide variety of sensing elements may allow more efficient control and rapid probing of chemical kinetics.

Considering the above-described advantages of microfabricated chemical reactors, i.e., micro-reactors, it would be advantageous to provide an improved design for such a micro-reactor, and particularly for an improved micro-reactor adapted to perform heterogeneous catalytic reactions.

It also would be advantageous to provide a micro-reactor having a low surface to volume ratio and increased thermal and mass transfer, and which exhibits a relatively low pressure drop across the reaction channel under reaction conditions.

In addition, it would be advantageous to provide a micro-reactor that is designed to more rapidly and efficiently mix the reaction components of a heterogeneous reaction.

SUMMARY OF THE INVENTION

The present invention addresses the above needs, and others, by providing a microfabricated chemical reactor having a plurality of laminae with an inlet port and an outlet port. As used herein, a "plurality" refers to two or more of a particular item. The inlet and outlet ports are in fluid communication by a continuous channel formed in at least one of the laminae. Integral to the continuous channel and between the inlet port and the outlet port is a particle filter formed by a series of structures formed in at least one of the plurality of laminae and within the continuous channel.

The present invention also is directed to a microfabricated chemical reactor having a plurality of laminae with an inlet port and an outlet port and a continuous channel including a plurality of channels forming a reaction zone and providing fluid communication between the inlet port and the outlet port. The plurality of channels forming the reaction zone may provide a surface to volume ratio suitable to efficiently react the reaction components, while also providing for a relatively lower pressure drop through the reactor.

The present invention also provides a microfabricated chemical reactor having a first reactant inlet port, a second reactant inlet port, and an outlet port. The first reactant inlet port and the second reactant inlet port are in fluid communication with the outlet port by a continuous channel. The first reactant inlet port and the second reactant inlet port are connected to the continuous channel by a microfluidic manifold. In one embodiment, the microfluidic manifold comprises a plurality of inlet channels. The inlet channels may be an arrangement of a first set of inlet channels in fluid communication with the first reactant inlet port and that is interleaved with a second set of inlet channels in fluid communication with the second reactant inlet port.

The present invention further provides a microfabricated chemical reactor including a plurality of laminae, an inlet port, and an outlet port. A continuous channel provides fluid communication between the inlet port and the outlet port. Integral to the continuous channel are a plurality of catalyst support structures impregnated with a catalyst. The catalyst support structures may be produced by micro-machining techniques, which may provide for substantially identical support structure configurations.

The reader will appreciate the foregoing details and advantages of the present invention, as well as others, upon considering the following detailed description of embodiments of the invention. The reader also may comprehend additional details and advantages of the present invention upon making and/or using the present invention.

BRIEF DESCRIPTION OF THE DRAWINGS

The features and advantages of the present invention may be better understood by reference to the accompanying figures, in which:

FIG. 10(a)–(c) includes graphs illustrating the effect of gas and liquid flow rate on the rate of reaction (mol/min/mg of catalyst) in an embodiment of a microfabricated chemical reactor constructed according to the present invention, and also illustrates examples of correlations of the variables that effect mass transfer in various prior art reactors;

DETAILED DESCRIPTION OF EMBODIMENTS OF THE INVENTION

Figure 1:
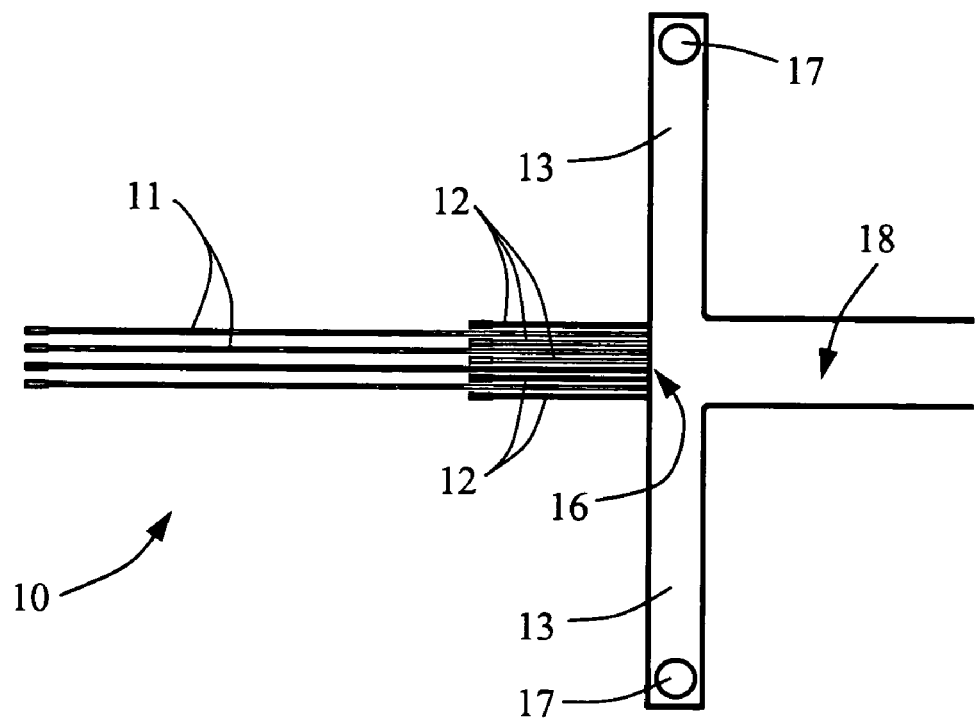
FIG. 1 is a schematic representation of the inlet portion of a single channel microfabricated chemical reactor constructed according to the present invention and adapted for use as a packed bed reactor, and showing the gas inlets, liquid inlets, and catalyst inlet.

Improvements in microfabricated chemical reactors would be highly beneficial to the chemical industry. The present invention provides significant improvements in such devices. The microfabricated chemical reactor of the present invention includes features that improve thermal and mass transfer and that also improve the efficiency of catalyst handling in such reactors. Certain embodiments of microfabricated chemical reactor of the present invention may be used to conduct numerous chemical reactions. However, the reaction apparatuses of the present invention are particularly useful in conducting heterogeneous catalytic reactions and, more particularly, gas and liquid phase heterogeneous catalytic reactions.

Microfabrication technology offers the opportunity to manufacture novel chemical reactor designs which offer improvements in process capability and process control and allow the more efficient elucidation of chemical kinetics. Particularly for multiphase reactions, the opportunity to manipulate at the micron scale the means and conditions by which two or more phases contact, mix, react, and separate afford the reaction engineer an unprecedented degree of control over the chemical reaction. Reactor dimensions can now be scaled with high-aspect ratio features smaller than 100 microns of any given planar complexity. Batch fabrication allows these designs to be manufactured efficiently and with a high level of control on tolerance. Operating a multitude of microreactor units in parallel could achieve any desired production capacities and offer distinct advantages over traditional modes of processing. In addition, by constructing reactors using silicon micromachining methods, the opportunity to integrate a wide variety of sensing elements could allow more efficient control and rapid probing of chemical kinetics.

Multiphase reactions present a unique opportunity for microfabricated reactors. In addition to traditional thermal control problems, there is the added complexity of forcing a reactant of one phase to mix, diffuse, and react with that of another. For three-phase reactions, the chemical kinetics are often limited by the mass transfer rate of the gaseous component through the liquid to the catalyst surface. Hydrogenations represent a typical and ubiquitous gas-liquid-solid reaction. Hydrogenations are typically exothermic and consequently thermal uniformity and adequate temperature control is of primary concern. Hydrogen is typically reacted with an organic substrate over a supported noble metal catalyst in either a slurry or a packed bed reactor. It has been estimated that nearly 20% of all the reaction steps in a typical fine chemical synthesis are catalytic hydrogenation reactions.

Owing to the limited solubility of hydrogen in organic substrates and solvents, efficient mixing is a primary concern in hydrogenations. The high energy requirements for vaporization of organic compounds precludes gas-phase hydrogenation for a wide range of compounds. Therefore, there is a continuing effort to perform these reactions in three-phase reactors. Continuous industrial reactors are usually classified accordingly to their flow dynamics. In trickle bed reactors, for example, the largest volume of the reactor is occupied by the gas phase and the liquid merely forms a thin film around the catalyst pellet. The reaction occurs in this thin film of liquid. Reaction engineers are concerned with the uniform distribution of the liquid over the catalyst within the trickle bed reactor or similar reactors. Uneven flow distribution can lead to incomplete utilization of the catalyst or local zones of varying reaction rate and temperature. Poor distribution of the fluids can thus lead to local "hot spots" which may decrease the selectivity, or lead to side reactions which may cause reactor runaway. In addition to losses in selectivity, poor thermal management can decrease the life of a catalyst and further reduce the efficiency of a reactor.

The high surface-volume ratios attainable in microfabricated structures may improve thermal management and mass transfer rates. Many liquid phase micromixer designs have emerged in recent years, most of which rely upon lamination and diffusion at short length scales. However, it has been found that by increasing the interfacial contact area between two mixing fluids and by reducing the characteristic length scale, the rate of mass and thermal transfer can be accelerated. For rapid multiphase reactions, which are limited by mass transfer effects, a reduction in scale commensurate with increased surface area may ultimately improve process efficiency and improved kinetic reaction rates.

An embodiment of the present invention provides a microfabricated reactor adapted for conducting multiphase reactions. In this embodiment, gas and liquid reactants are mixed by maximizing the interfacial contact area between the two phases. The separate inlet gas and liquid streams are split into multiple channels that are interleaved and meet at a microfluidic manifold positioned upstream of one or more reaction channels. The inlet gas and liquid streams intimately mix and, depending on the reaction type, react or are passed through a catalytic reaction bed to assist the formation of the desired products. In one embodiment of the present invention, standard catalyst powders are provided in the one or more reaction channels. Catalyst powders may be used to take advantage of their large surface areas and known chemistry. In order to retain the catalyst particles within the one or more reaction channels, a filter consisting of a series of posts is formed near the outlet of each reaction channel.

The classical heterogeneous hydrogenation reactions of (i) α-methylstyrene (AMS) to cumene and (ii) cyclohexene to cyclohexane were used as model reactions to demonstrate the advantages of embodiments of the microfabricated chemical reactor of the present invention. For multiphase reactions, the overall reaction rate can be expressed in terms of a sum of resistances. The mass transfer resistances of a three-phase reaction consist of resistance to gas absorption into the liquid, diffusion of the dissolved gas from the bulk liquid to the catalyst surface, and diffusion of the reaction component inside the porous catalyst to the active site. Since diffusion times scale with the square of the characteristic length, appreciable gains in reduction of diffusion rates may be made at the small dimensions achieved in microfabricated structures.

The established method for assessing diffusion within a porous catalyst is to use an effectiveness factor, η, which is a function of the Thiele modulus, φ. For a spherical catalyst particle and first order reaction, the Thiele modulus takes the form, $$\phi = \frac{D_p}{2}\sqrt{\frac{kp_p}{D_e}}$$

where k is the rate constant, $\rho_p$ is the particle density, $D_p$ is the particle diameter and $D_e$ is the effective diffusivity. The square of the Thiele modulus represents the ratio of the characteristic time for diffusion in the pores to the characteristic time for the reaction to occur. Values of the Thiele modulus have been determined for the AMS hydrogenation reaction on palladium impregnated alumina catalysts. Extending calculations for the effectiveness factor to scales on the order of 50 μm indicates that diffusion in the pores is unlikely to pose a significant resistance. For a 50 μm diameter spherical catalyst particle, $\phi^2=0.03$, indicating that the surface reaction is the dominant time scale and will control the reaction rate. For the catalyst dimensions (as small as 550 μm) employed in a trickle bed reactor, $\phi^2=3.7$, and therefore, diffusion to the catalytic site is the rate controlling step.

The second diffusional resistance involves the external transfer of the dissolved gas within the liquid film surrounding the catalyst. The Frössling correlation can be used to correlate the mass transfer from a liquid to a spherical particle.

$$Sh = \frac{k_c d_p}{D} = 2 + 0.6\, Re^{1/2}Sc^{1/3}$$

where D is the diffusivity, $k_c$ is the mass transfer coefficient, $d_p$ is the particle diameter, Re is the Reynolds number and $S_c$ is the Schmidt number. The Schmidt number for hydrogen in AMS at 40° C. is 56.7. The Reynolds number is 0.05 based on a particle diameter of 50 μm and the liquid flow rate, 0.01 mL/min, used in an embodiment of the microfabricated chemical reactor of the present invention. Consequently, the Sherwood number indicates that the microfabricated reactor nearly approximates a stagnant thin film model. Therefore, the rate for external mass transfer, $R_E$, depends on the mass transfer coefficient, $k_c$, and the surface to volume ratio of the catalyst particles in the reactor. Ultimately, the mass transfer rate scales as $$R_E \propto \frac{1}{d_p^2}$$

so that reducing the particle diameter or thickness of the liquid film would have an increasingly larger impact on the mass transfer rate for external diffusion.

The third resistance to mass transfer involves the absorption of the gas into the liquid. The rate of absorption can be expressed as $$R_A = k_L a (C_1 - C_b)$$

where $k_L$ is the gas absorption mass transfer coefficient, a is the interfacial gas-liquid contact area per volume, $C_i$ is the interfacial gas concentration, and $C_b$ is the bulk concentration of dissolved gas. Provided that the mixing phases are evenly dispersed throughout the packed bed, the interfacial contact area per volume can be made to be large within microfabricated chemical systems. Through novel microfabricated designs, high surface area structures were created which force the gas and liquid reactants to mix more effectively by promoting dispersion and preventing macro-scale coalescence of the two phases. Examples of the present microfabricated chemical reactor follow.

EXAMPLE 1

A first design of a microfabricated reactor within the present invention has been adapted to the chemistry of heterogeneous catalytic reactions. For such reactions, the high surface areas of traditional porous catalytic supports allow for a greater dispersion of the active surface sites and consequently, a higher reaction rate per volume of support. For heterogeneous catalytic reactions of moderate rate, such as some hydrogenations, processing in small volumes requires the highest attainable active surface area in order to have a practical reactor production rate. Planar metal films, while easy to integrate into microfabricated reactor designs using known thin film application methods, cannot attain the same active area as traditional catalyst particles through geometry alone. Therefore, while thin film catalysts may be sufficient for fast gas-phase reactions, such as ammonia oxidation, higher surface area catalysts can extend the range of applicable reactions in the microenvironment. An advantage of using standard catalysts, such as noble metals supported on inert porous materials, is that information on chemical kinetics occurring under many different reaction conditions is readily available. Also, with standard catalysts catalyst preparation becomes a matter of properly separating discrete particle size ranges and loading the reaction channels. A principal difficulty of using standard catalysts lies only in choosing the proper dimensions of reactor and catalyst particle size in order to maintain an acceptable pressure drop and an acceptable production rate.

Consequently, a critical issue in microfabricated chemical reactors of the present invention including one or more packed bed reaction channels is the pressure drop. As the surface to volume ratio increases, the resistance to fluid flow also increases. For microfabricated reaction systems, in general, the engineering design challenge is to balance the improvements in heat and mass transfer with the losses in pressure drop. For packed channels, the length scales that determine the pressure drop, $\Delta P$, are the diameter of the particle $D_p$, the cross-sectional area of the flow $A_s$, and the channel length, L. The flow rate is dictated by the kinetics of the reaction, and fortunately for multiphase reactions, the kinetics are such that the space velocity at maximum conversion is not high.

The functional dependence of the pressure drop for a packed bed obtained from the Ergun equation is given by, $$\frac{\Delta P}{L} \propto \frac{\mu \cdot G}{D_p^2 \cdot A_s} \cdot \frac{(1-\varepsilon)^2}{\varepsilon^3}$$

where G is the superficial mass velocity, $\mu$ is the viscosity of the fluid, and $\varepsilon$ is the void fraction. For a given volume of packing with constant residence time, this functional dependence indicates a short, large diameter reaction channel as having the optimum configuration for minimizing the pressure drop. If the reactions are not mass transfer limited, then the capacity for conversion should depend on the amount of catalyst and not on the specific geometry. However, a problem with operating such a design is obtaining an even distribution of reactants over the inlet diameter of the reaction channel and controlling the temperature profile across the entire width of the large diameter reaction channel. Since the temperature of most tubular reactors is controlled through the exterior radial walls, maintaining a constant temperature in a large diameter reactor would be increasingly hindered by radial gradients in the temperature profile. The present inventors concluded that splitting the flow into multiple reaction channels so that the effective cross-sectional area of the reaction channel is large would reduce the pressure drop while maintaining the same reactor throughput and high surface-to-volume ratio. Microfabrication methods have the potential for efficiently constructing such a reactor design.

Figure 2:
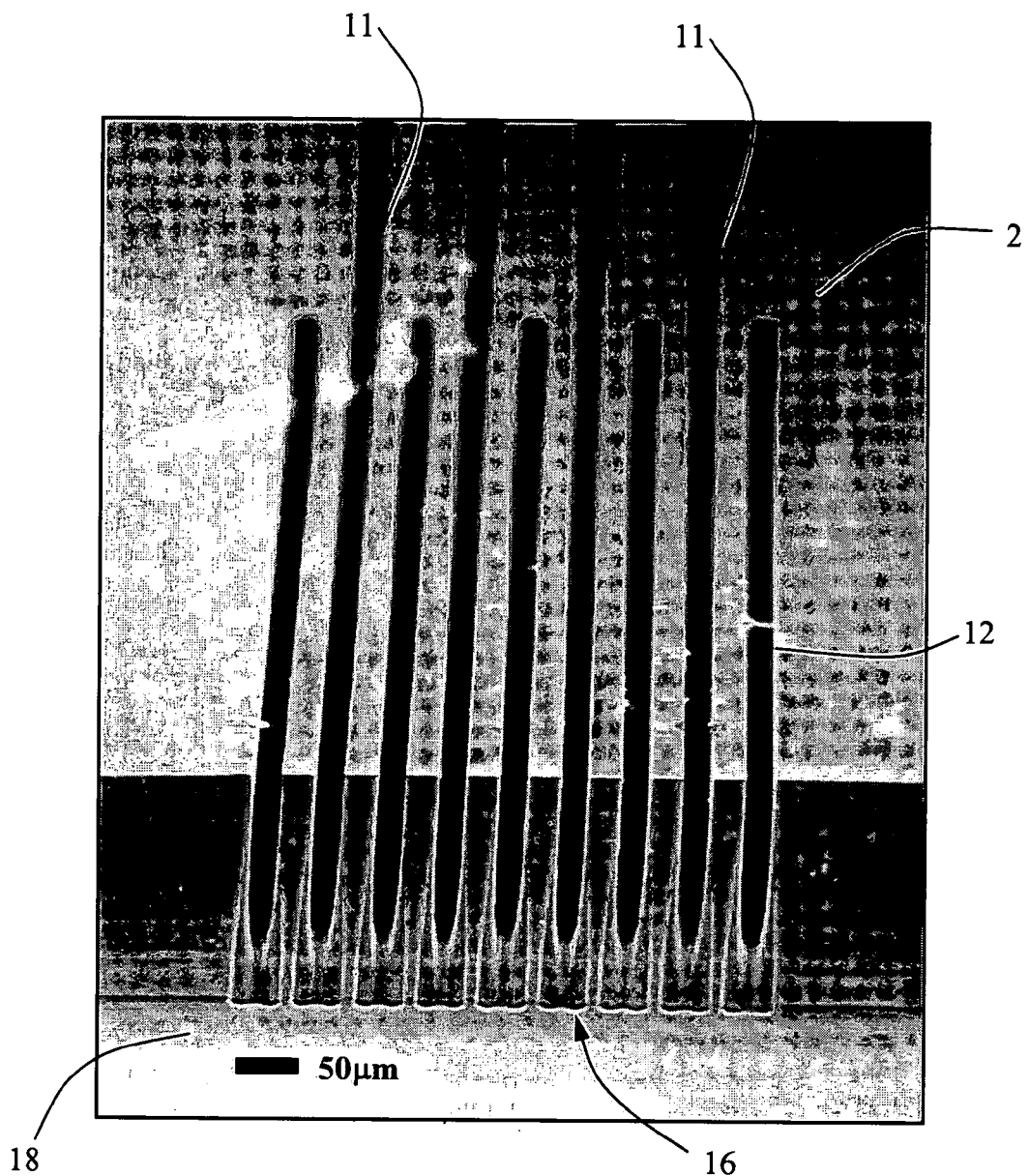
FIG. 2 is a scanning electron photomicrograph of the microfluidic inlet manifold of a microfabricated chemical reactor constructed according to the present invention.
Figure 3:
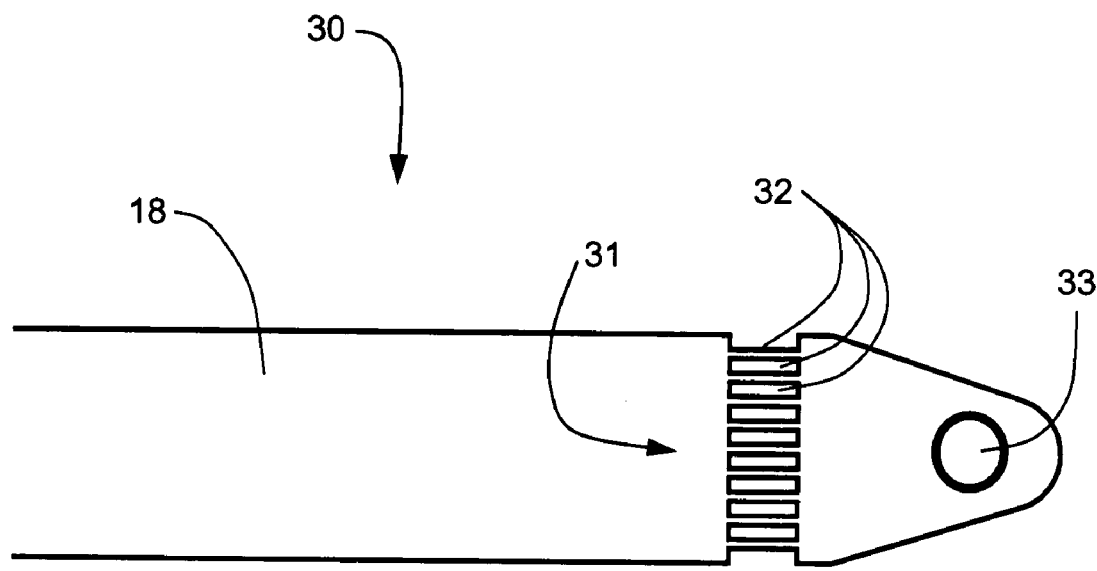
FIG. 3 is a schematic representation of the outlet region of a microfabricated chemical reactor constructed according to the present invention and including a particle filter comprising structures in the reaction channel which retains packing material in the reaction channel.
Figure 4:
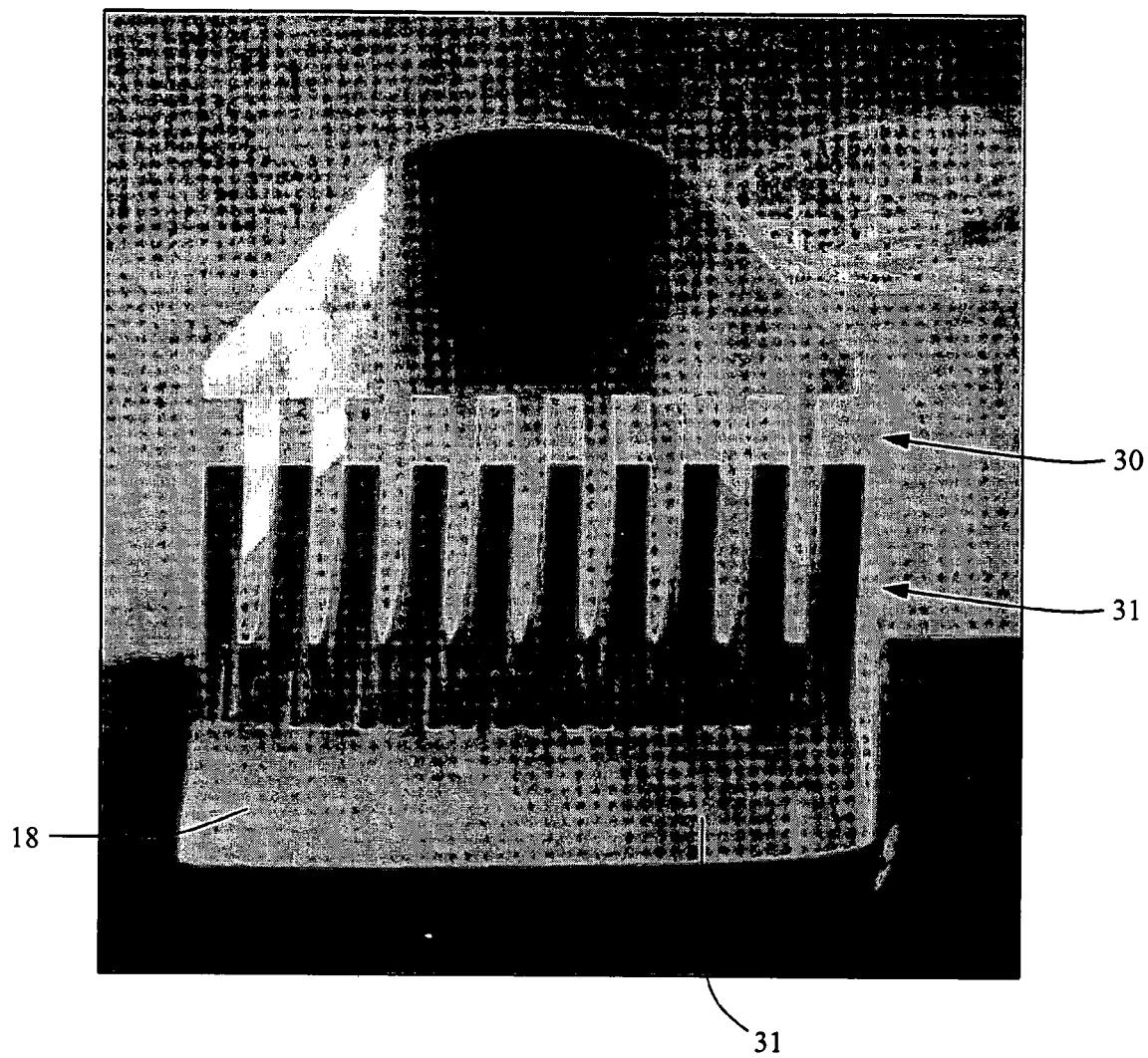
FIG. 4 is a scanning electron photomicrograph of the outlet portion of a microfabricated chemical reactor constructed according to the present invention and showing the particle filter of the reactor.

FIG. 1 schematically depicts reactant inlet portion 10 of an embodiment of a microfabricated chemical reactor, designated generally as 1, includes a single reaction channel and is constructed by micromachining a silicon according to the present invention. Gas inlet channels 11, and liquid inlet channels 12 meet at microfluidic manifold 16 at an upstream end of main reaction channel 18. In the embodiment shown in FIG. 1, gas inlet channels 11 and liquid inlet channels 12 are 25 $\mu$m wide and reaction channel 18 is 625 $\mu$m wide. Perpendicular to inlet channels 11 and 12 are two 400 $\mu$m wide particle inlet channels 13. In order to pack reaction channel 18 with catalyst or other particles, a particle slurry is introduced into particle inlet channels 13 through particle inlets 17. FIG. 2 is a scanning electron photomicrograph of the interleaved orientation of gas inlet channels 11 and liquid inlet channels 12 and shows where the channels 11 and 12 form the microfluidic manifold 16 at reaction channel 18. FIG. 3 illustrates an outlet portion 30 of reactor 1. A particle filter 31 constructed of a series of posts 32 is formed by etching the silicon substrate at the outlet of 2 cm long reaction channel 18. The posts 32 retain packing material in reaction channel 18 and prevent the packed particles from exiting the reaction channel 18 through exit port 33 formed through the silicon substrate. FIG. 4 is a scanning electron photomicrograph of the outlet portion 30 showing the particle filter 31 intermediate reaction channel 18 and the region in which outlet port 33 is formed through the silicon substrate.

Figure 5:
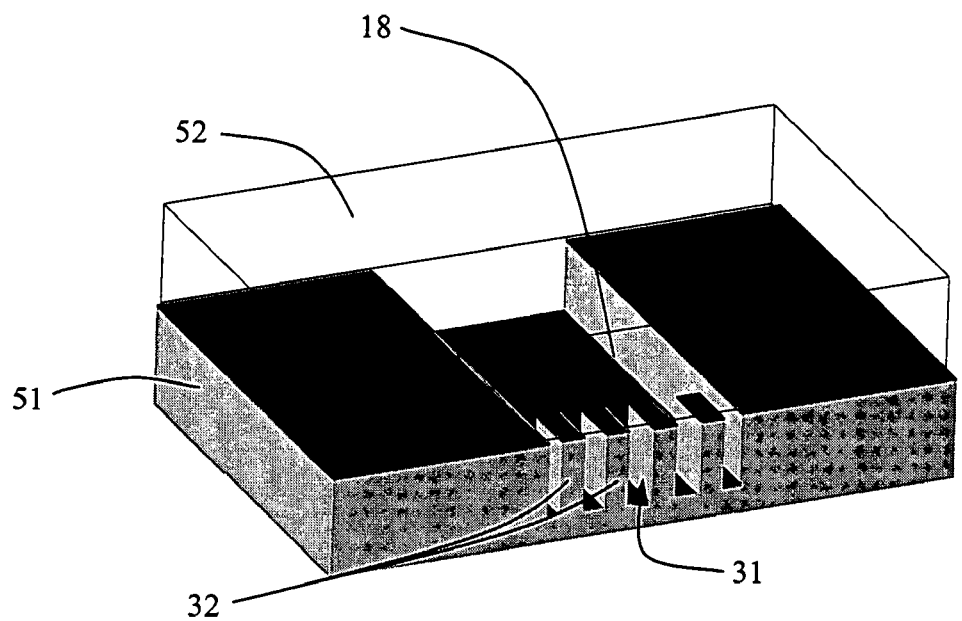
FIG. 5 is a schematic representation of a cross-section through a microfabricated chemical reactor constructed according to the present invention and including 300 $\mu$m channels formed in a 500 $\mu$m silicon wafer substrate capped with a 500 $\mu$m PYREX glass laminate.

One method of fabricating reactors within the present invention involves at least two etch steps and formation of an anodic bond. FIG. 5 is a schematic representation showing a cross-section through an outlet region of a microfabricated chemical reactor constructed according to the present invention, such as reactor 1. The reactor includes a 300 $\mu$m deep reaction channel 18 formed in a 500 $\mu$m silicon wafer substrate 51 capped with a 500 $\mu$m PYREX glass laminate 52. Twelve groupings of topside channels 11, 12, 13, and 18 are first formed on silicon wafer substrate 51 by using a time-multiplexed inductively coupled plasma etch process. The depth of etch is controlled by timing the etch to approximately 300 $\mu$m. As may be seen FIG. 2, a loading effect in the etch process causes the 25 $\mu$m wide inlet channels 11 and 12 to be approximately 20% more shallow than the reaction channel 18. The silicon wafer 52 is then patterned from the bottom side to provide ports, such as particle inlets 17 and outlet port 33, to access the various channels 11, 12, 13, and 18. The final step in the process is to cap the channels 11, 12, 13, and 18 with Pyrex glass 52 using an anodic bond. The wafer may then diced into twelve reactors with dimensions of 1.5 cm×3.5 cm.

Figure 6:
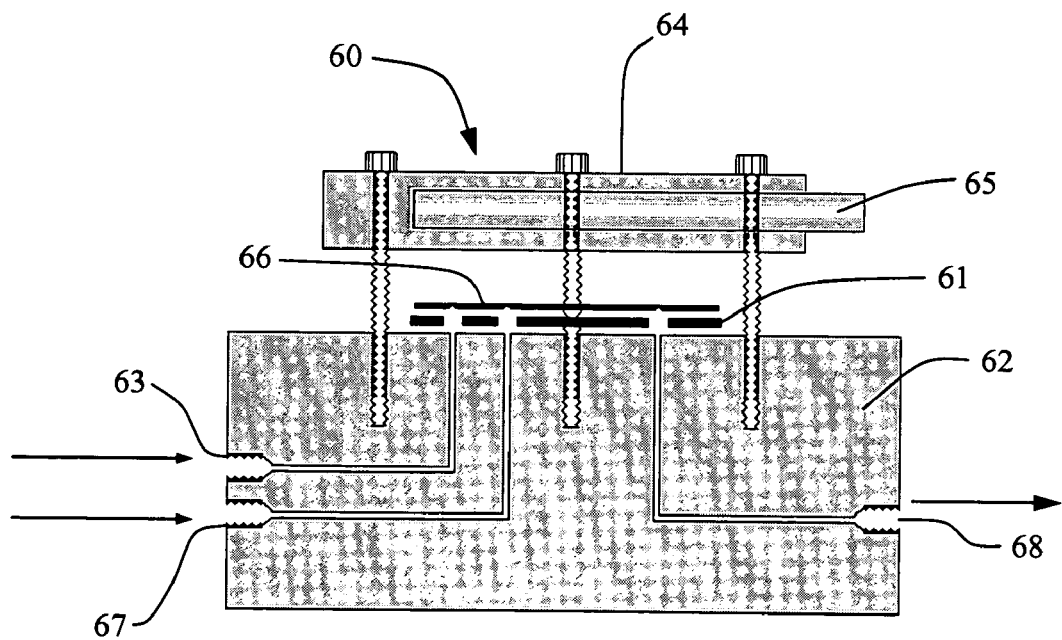
FIG. 6 is a schematic cross-sectional view of a system configuration and reactor packaging of a microfabricated chemical reactor constructed according to the present invention.

FIG. 6 illustrates the system and packaging of a reactor assembly 60 including a microfabricated packed-bed chemical reactor 66 constructed according to the present invention. The reactor 66 may be, for example, reactor 1 shown in FIGS. 1–5. The silicon-glass reactor 66 is compressed against a thin Viton gasket sheet 61 in order to form a fluidic connection to stainless steel base 62 that has been machined with connectors 63, 67, and 68 for standard high-pressure fittings. The aluminum cover plate 64 contains a single cartridge heater 65. A mass flow controller delivers hydrogen gas to the reactor 60 at gas inlet connector 63, while a syringe pump delivers liquid reactant to liquid inlet connector 67. In the embodiment wherein, for example, reactor 60 has the construction of reactor 1, hydrogen gas is delivered to gas inlet connector 63 and passes to gas inlet channels 11 and liquid reactant is delivered to liquid inlet connector 67 and passes to liquid inlet channels 12. The reactants are mixed at microfluidic manifold 16 and pass into reaction channel 18. The reaction mixture then passes out of reaction channel 18 at outlet port 33 and may be collected at connector 68.

A variety of materials may be loaded as packing into microfabricated reactors constructed according to the present invention, such as the reactor illustrated in FIGS. 1–6. Packing materials include, but are not limited to, glass microspheres, polystyrene beads, and catalyst powders. The carbon and alumina supported metal catalysts powders used in the experiments described herein were obtained from Aldrich Corporation. The catalyst particle sizes were separated using standard sieving equipment. The 50–75 $\mu$m fraction was retained, and a slurry of that fraction of catalyst was formed using ethanol. The slurry was delivered to the reaction channel 18 of reactor 1 using the larger 400 $\mu$m wide side channels 13 shown in FIG. 1. A Plexiglas cover plate was used in the place of the aluminum cover plate 64 in the system of FIG. 6 in order to visualize the packing process. One particle inlet channel 13 was used as an inlet and the other channel 13 as an outlet in order to maintain a steady flow perpendicular to the reaction channel 18. Flow of liquid from the main liquid inlets 12 would then redirect a portion of the slurry flow towards the reaction channel 18.

Figure 7A:
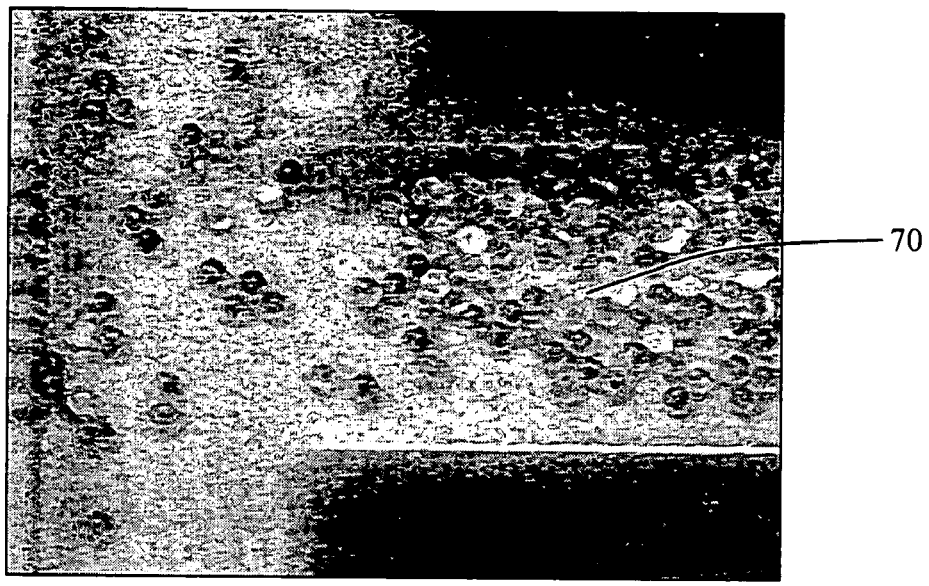
FIGS. 7(a) and 7(b) are photomicrographs of 50 $\mu$m glass particles loaded into a reaction channel of a microfabricated chemical reactor constructed according to the present invention.
Figure 7B:
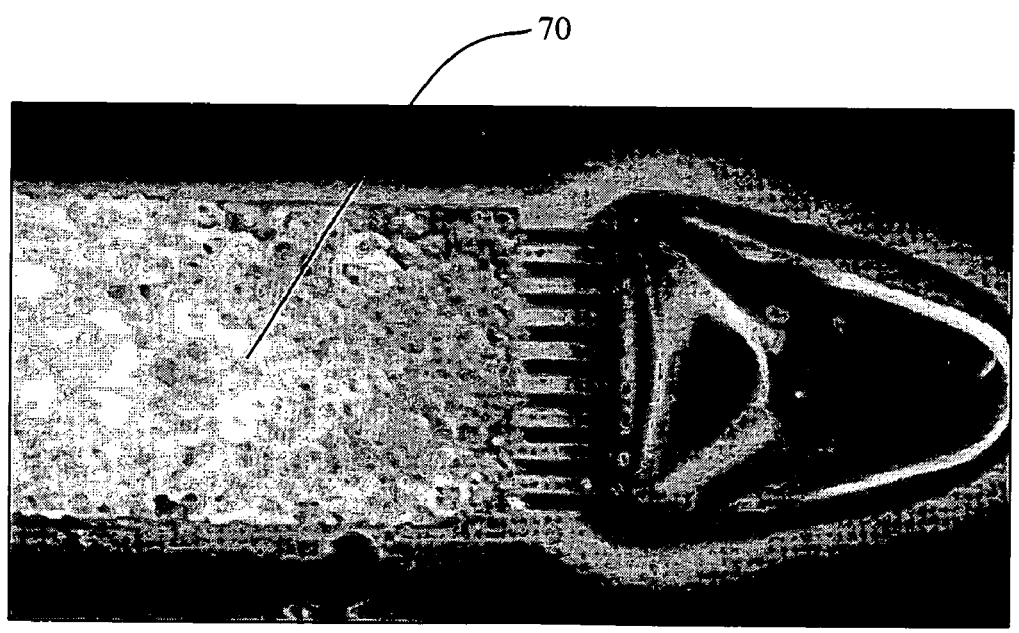

For the packing of 50 $\mu$m glass spheres into reaction channel 18, the packing was added without a solvent. Dry glass spheres were loaded by creating a particle supply well above inlet ports 17 and continuously agitating reactor. FIGS. 7(a) and (b) are photomicrographs of glass spheres 70 packed in microfabricated reactor 66. Once the reactor is loaded with packing material, inlet ports 17 may be closed off by either substituting a gasket 61 that covers the ports 17 or capping external fittings on the connectors that are coupled to inlet ports 17.

Figure 8:
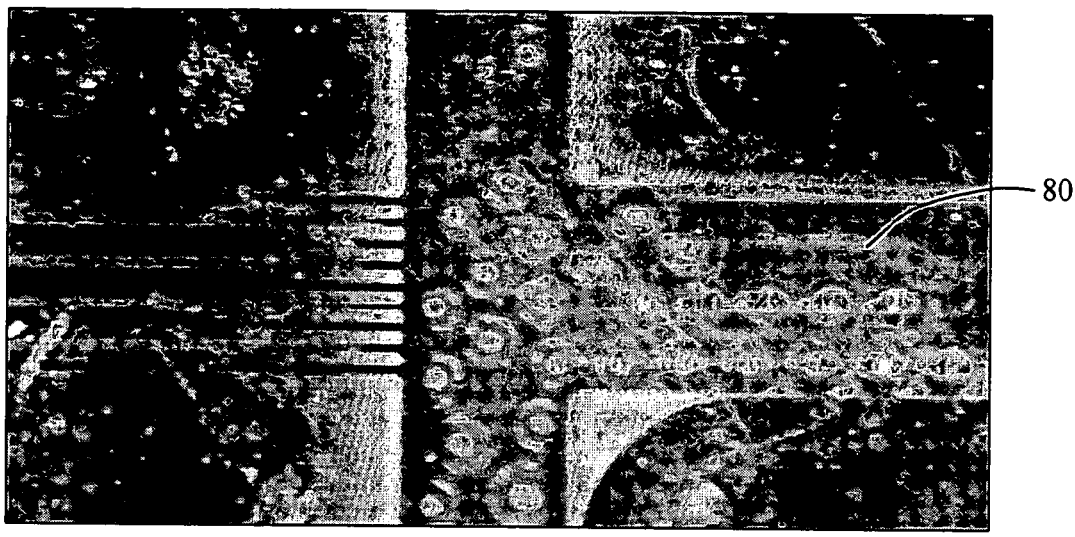
FIG. 8 is a photomicrograph of 50 $\mu$m glass particles loaded into a microfabricated reactor constructed according to the present invention under co-current flow conditions of water and air.
Figure 9:
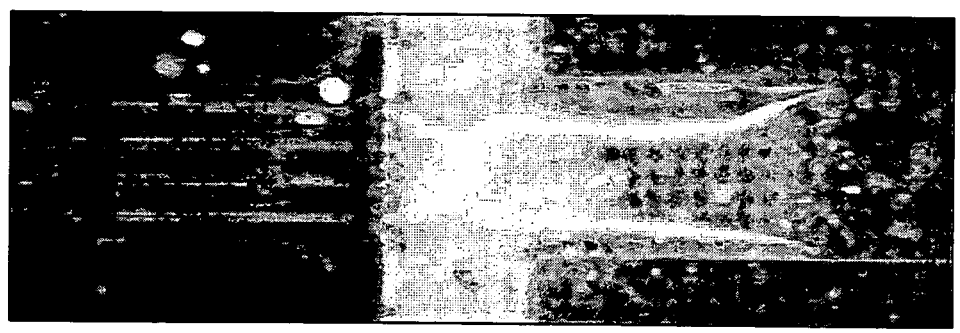
FIG. 9 is a photomicrograph of 50 $\mu$m glass particles loaded into a microfabricated reactor constructed according to the present invention under co-current flow conditions of $H_2$ and heptane over packed particles.
Figure 10A:
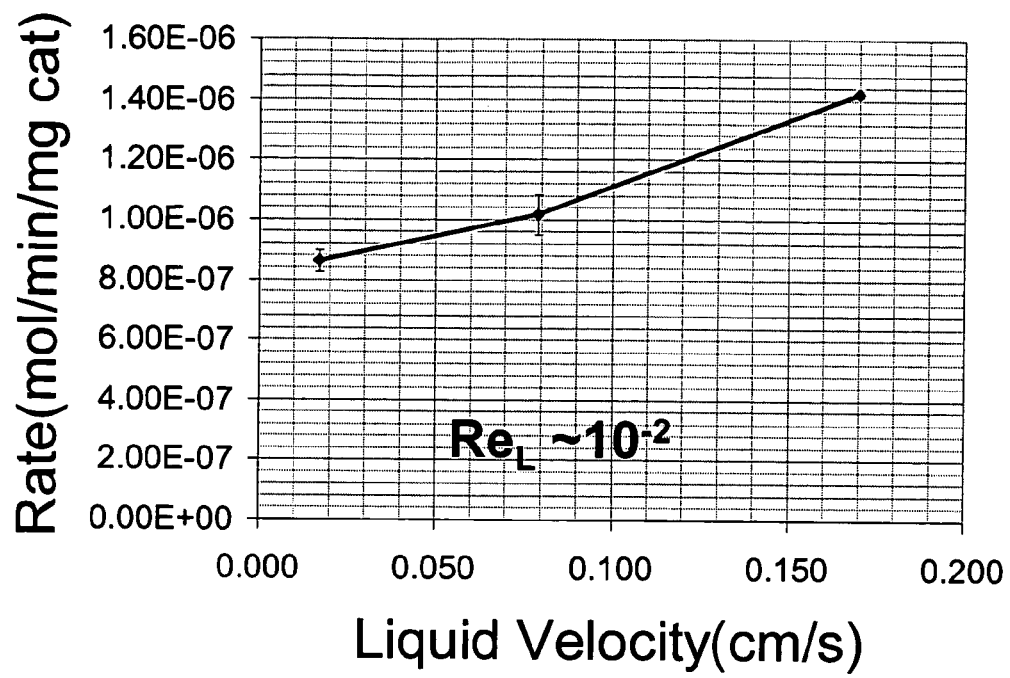
Figure 10A:
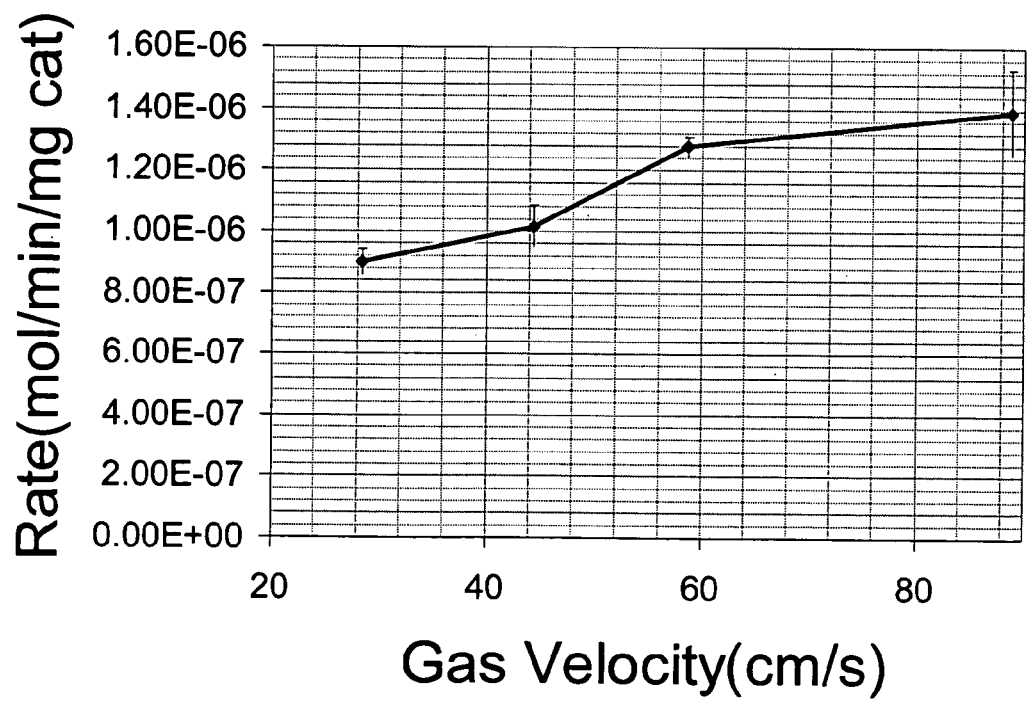

Representative images of dual gas-liquid flow in a reactor constructed according to the present invention are presented in FIGS. 8 and 9. FIG. 8 depicts gas-liquid flow in the absence of packing in the reaction channel 80. The fluids are water and air and the bubble size is approximately 150 $\mu$m. FIG. 9 depicts mixing of hydrogen with heptane in a similarly constructed reactor over a bed of catalyst. In FIG. 9, the flow is characterized by rapid mixing of reactants before distribution at the catalyst bed. FIG. 10(a) shows graphs of the effect of gas and liquid flow rate on reaction rate (mol/min/mg of catalyst) in an embodiment of a microfabricated chemical reactor constructed according to the present invention. Example equations in the literature correlating variables that effect mass transfer are shown in FIG. 10(b) (derived from Wild, G., F. Larachi et al, (1992). Heat and Mass Transfer in Gas-Liquid-Solid Fixed Bed Reactors. *Heat and Mass Transfer in Porous Media*. M. Quintard and M. Todorovic. Amsterdam, Elsevier: 616) and FIG. 10(c) (derived from Satterfield, C. N. (1975). "Trickle-Bed Reactors" AIChE Journal, 21, 2, p. 209).

The hydrogenation of $\alpha$-methylstyrene (AMS) to cumene is a standard reaction that has been used to gauge mass-transfer effects in catalyst pellets and in fixed bed reactors. Various physical properties, such as the solubility and diffusivity of hydrogen in AMS, are readily available in the literature. The reaction is exothermic ($\Delta H = -100$ kJ/mol), and the intrinsic kinetics are known for a variety of catalysts. The kinetic behavior is often first order in hydrogen and zero order in substrate. The reaction is moderately fast at room temperature and 1 atmosphere pressure hydrogen.

Carbon supported palladium catalysts were used by the inventors in several reactions at 50° C. in multiple reaction channel chemical reactors constructed according to the present invention. The effluent from the reactor was collected in fractions and analyzed using GC/MS. Conversions from 20% to 100% were observed depending on the feed composition and flow rates. Initial reaction rates for the hydrogenation of AMS were near 0.01 mmol/min per reaction channel without prior activation of the catalyst and compared favorably to intrinsic kinetics reported in the literature.

For fast chemical reactions of a gas component and liquid component on a solid catalyst, the chemical kinetics are typically limited by the mass transfer rate of the gaseous species into the liquid, through the liquid, and to the surface of the catalyst. By increasing the surface area over which the gas and liquid streams must contact, the mass transfer limited reaction rates can be improved.

Figure 11A:
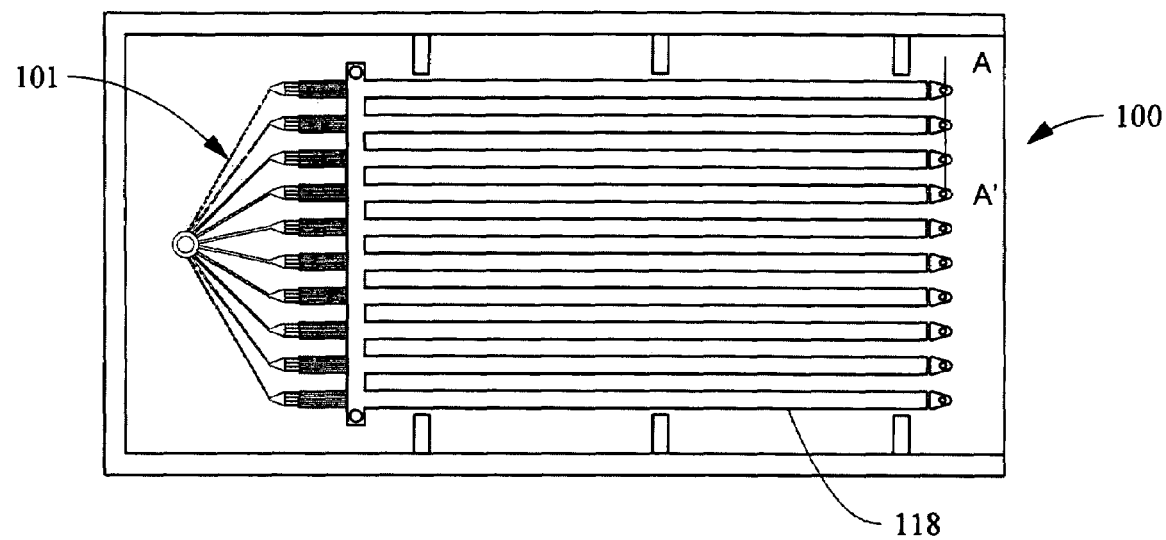
FIG. 11(a) is schematic representation of a multiple channel microfabricated chemical reactor constructed according to the present invention.
Figure 11B:
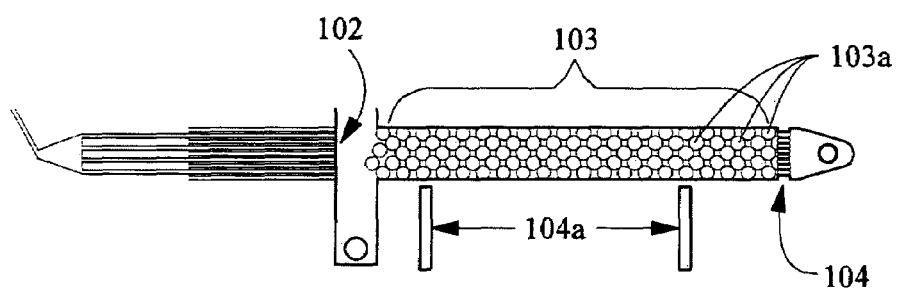
FIG. 11(b) is an enlarged representation of one of the channels of the multiple channel microfabricated chemical reactor depicted in FIG. 11(a) an illustrates an arrangement of an inlet microfluidic inlet manifold for two reagents, a reaction channel packed with particles, an integrated thermocouple, and a 25 $\mu$m particle filter.
Figure 11C:
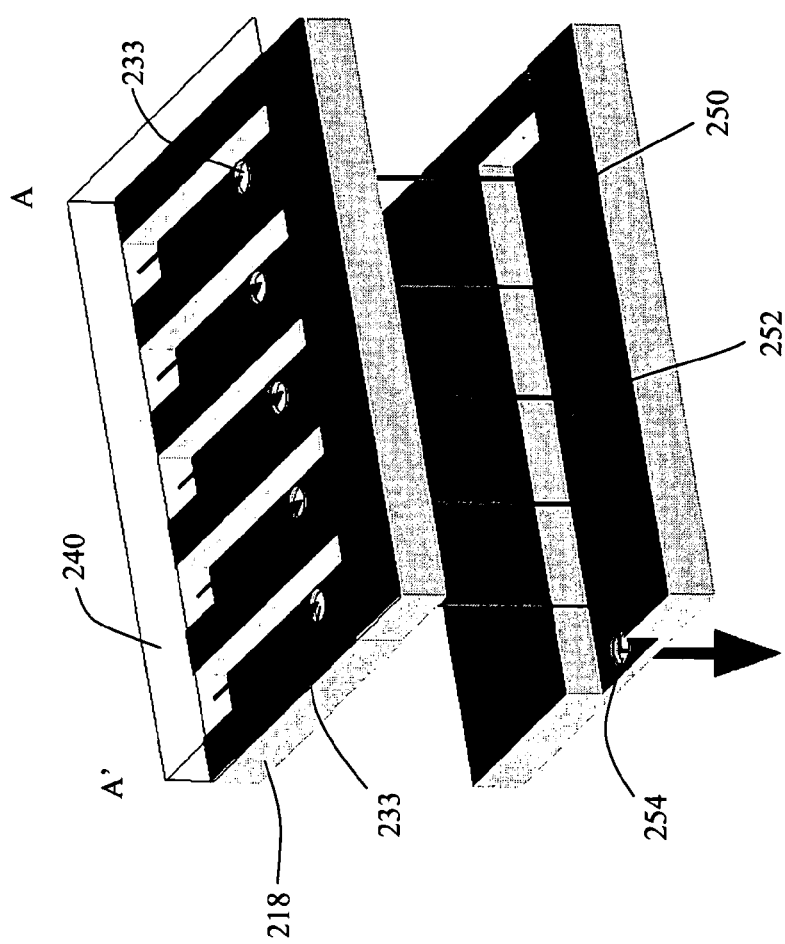
FIG. 11(c) is a schematic representation of a cross-section of microfabricated chemical reactor of FIG. 11(a) taken along line A–A' showing a glass lamina, a reactor lamina formed from a silicon substrate, and a collection chamber formed in a second silicon lamina.

Microfabricated chemical reactors constructed according to the present invention may include a single reaction channel or multiple reaction channels. FIG. 11(a) is a schematic representation of microfabricated reactor 100 of the present invention having ten reaction channels 118 connected in parallel to a microfluidic distribution network 101. FIG. 11(b) is an enlarged view of a region the reactor 100 depicted in FIG. 11(a) showing an inlet microfluidic inlet manifold 102 for the introduction and mixing of two reactants, a reaction channel 103 packed with particles 103a, a 25 μm particle filter 104, and two thermocouples 104a. FIG. 11(c) illustrates a section through reactor 100 generally along line A–A' of FIG. 11(a). FIG. 11(c) reveals reactor 100 is a multiple lamina microfabricated chemical reactor comprising middle lamina 210 including parallel reaction channels 218 and outlet ports 233, top lamina 240 that caps channels 218, and bottom lamina 250 including channel 252 for collection of the material passing through ports 233. Bottom lamina includes port 254 for recovery of materials passing into channel 252.

Figure 12:
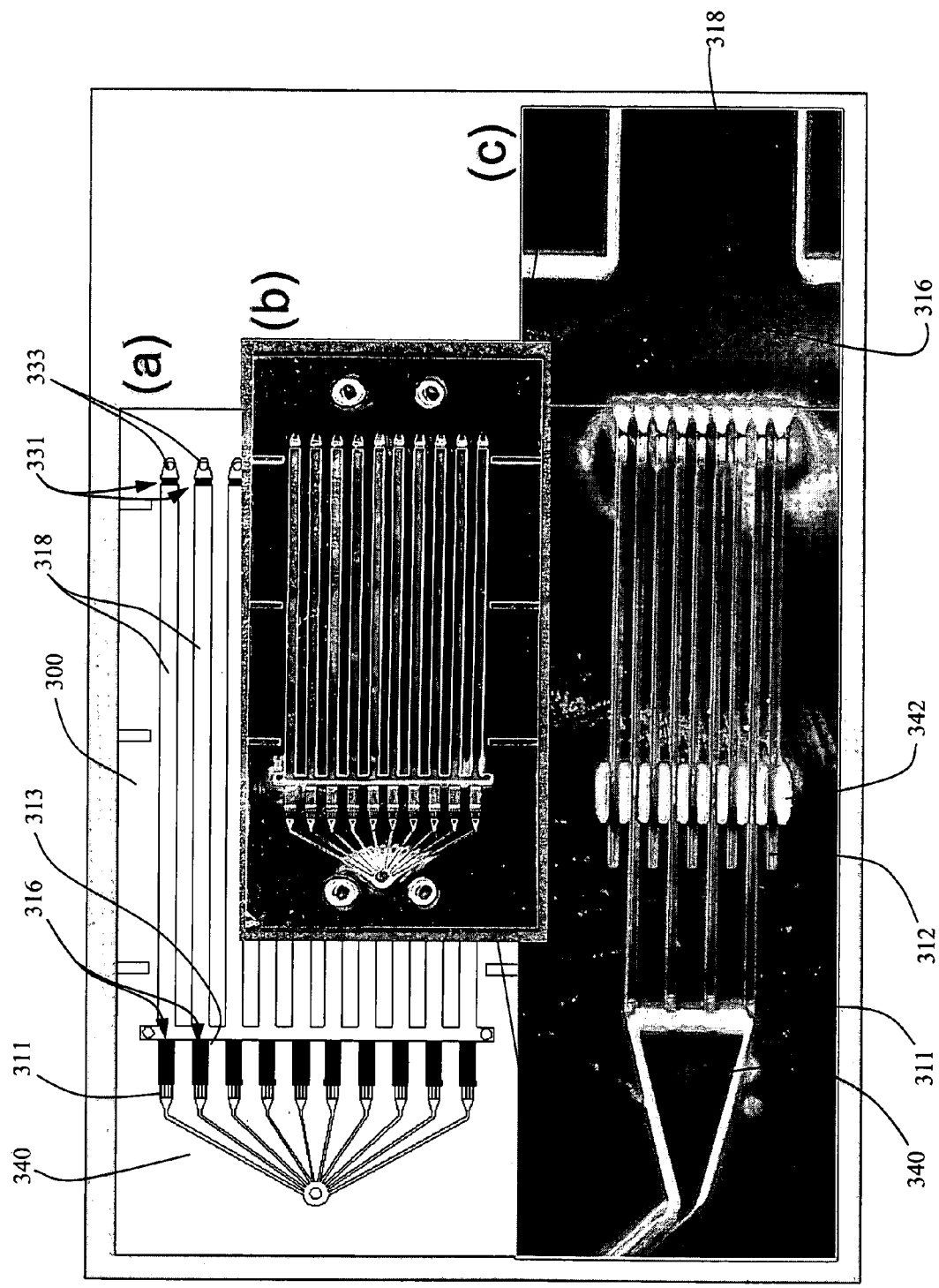
FIG. 12 is a schematic representation of a multiple channel microfabricated chemical reactor constructed according to the present invention, on which is superimposed a photomicrograph of a similarly constructed 1.5 centimeter wide multiple channel microfabricated chemical reactor having a 40 µL volume and an enlarged photomicrograph of a microfluidic inlet manifold constructed according to the present invention and positioned adjacent a 0.06 centimeter wide reaction chamber.

Both the single and multiple reaction channel reactors of the present invention may be constructed using standard silicon micromachining techniques. Such techniques are well known to those of ordinary skill in the art and, therefore, are not described in any detail herein. Known silicon micromachining techniques may be used to incorporate features at least as small as 25 μm on silicon substrates when fabricating reactors according to the present invention. FIG. 12 includes a schematic representation of an embodiment 300 of a multiple reaction channel reactor constructed according to the present invention channel of the present invention. As will be apparent from the above description of certain embodiments of the present invention, reactor 300 includes reactant inlets 311, particle inlet channel 313, reactant manifolds 316, reaction channels 318, filters 331, and outlet ports 333. Reactor 300 also includes manifold 340 for distributing a reactant to the ten sets of reactant inlets 311. FIG. 12(b) is a photomicrograph of a similarly constructed 1.5 centimeter wide multiple channel microfabricated chemical reactor with a volume 40 μL and is shown superimposed on a region of reactor 300. FIG. 12(c) is an enlarged photomicrograph of a microfluidic inlet manifold 316 adjacent a 0.06 centimeter wide reaction channel 318. Manifold 340 feeds reactant inlet channels 311, which are interleaved with reactant inlet channels 312 fed through inlet ports 342.

Figure 13A:
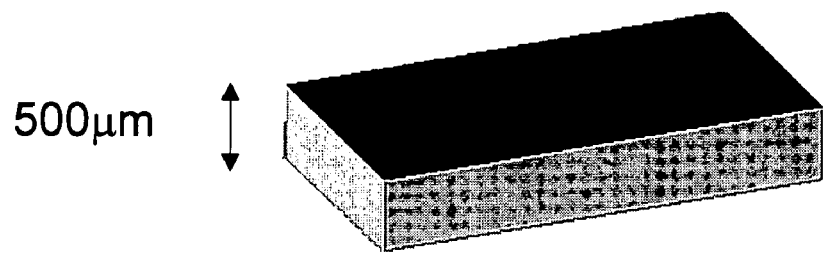
FIGS. 13(a)–(d) depict a fabrication process for a multiple lamina, multiple reaction channel microfabricated chemical reactor constructed according to the present invention.
Figure 13B:
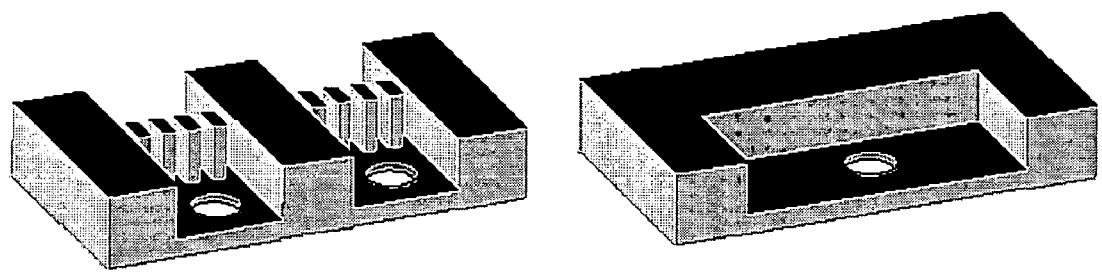
Figure 13C:
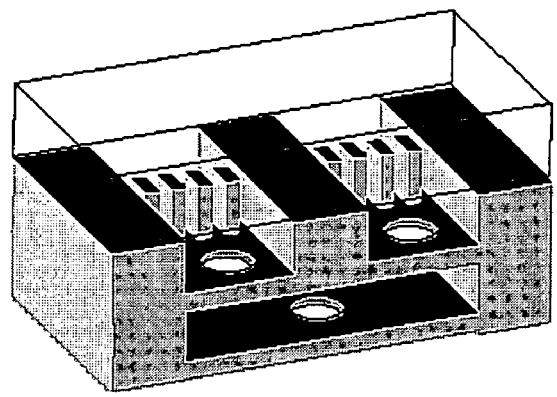
Figure 13D:
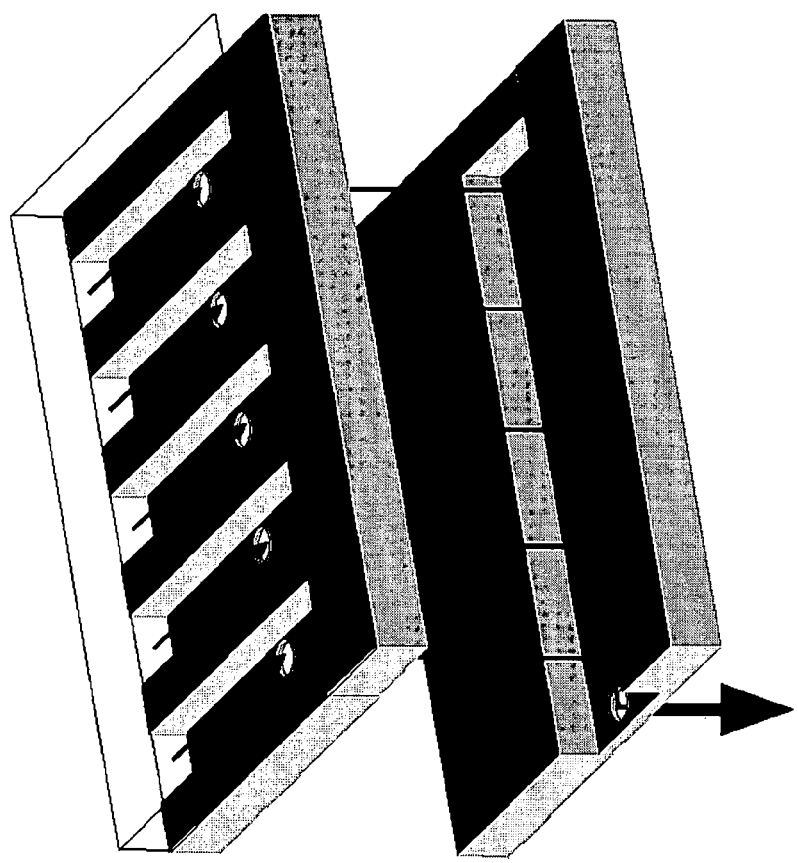

FIGS. 13(a)–(d) depict a fabrication process for a multiple lamina, multiple reaction channel microfabricated chemical reactor constructed according to the present invention. In a first step, FIG. 13(a), two 500 μm thick silicon substrates are provided. In a subsequent step, the top sides of the substrates are patterned and deep-reactive-ion etched to form channels. The back side of each substrate is etched to form access ports. Regions of the etched substrates are shown in FIG. 13(b). The etched silicon lamina are then fusion bonded and a Pyrex wafer is secured by an anodic bond to cap the upper etched silicon layer. A region of the multiple lamina reactor is shown in FIG. 13(c). As shown in FIG. 13(d), a channel array may be provided by etching and bonding providing two levels in the reactor for distribution and reaction of the reactants and collection of the reaction products.

Figure 14:
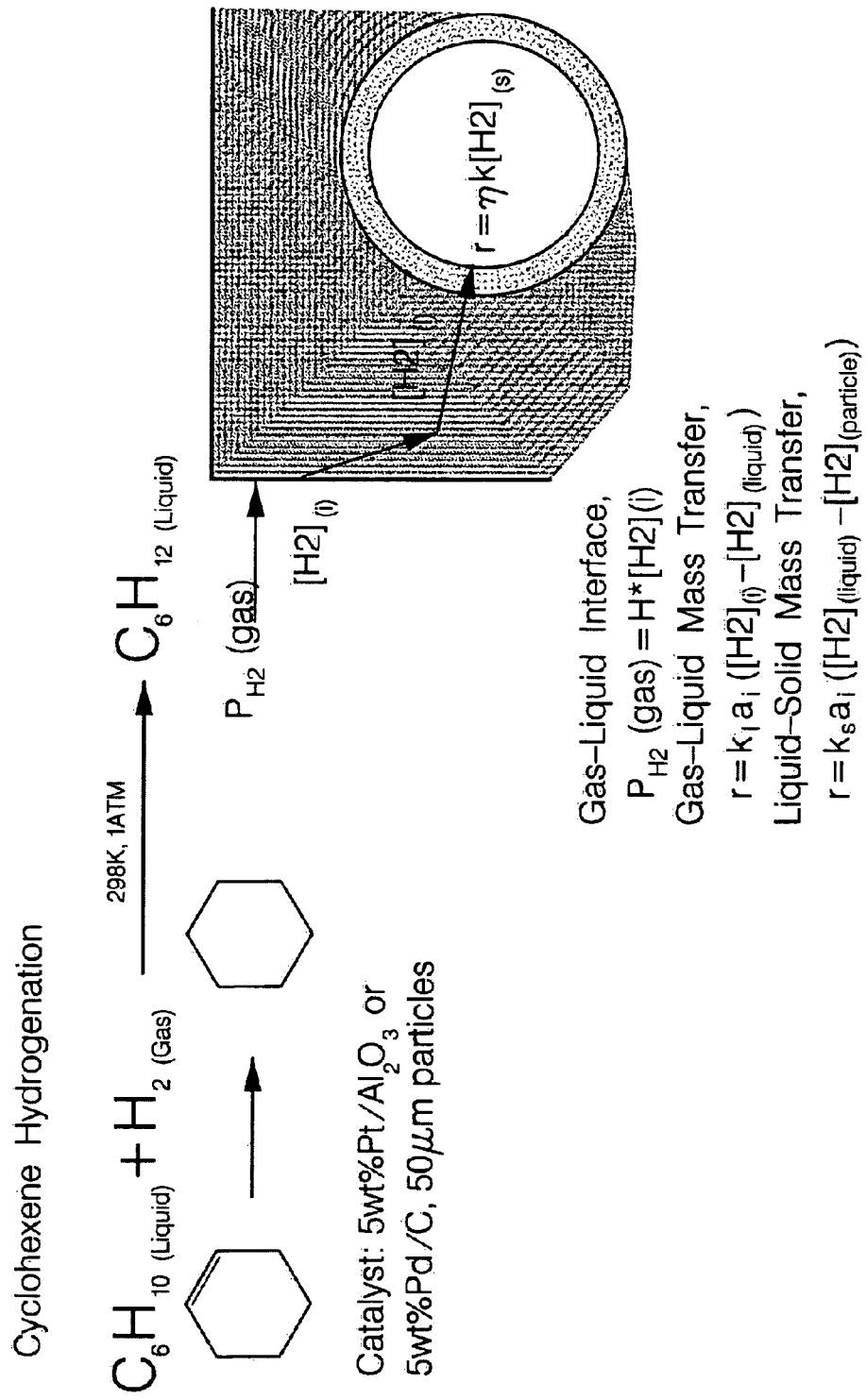
FIG. 14 illustrates a stoichiometric equation for the hydrogenation reaction of cyclohexene and a reaction rate equation including the controlling mass transfer effects and a graphical depiction of the mass transfer of a hydrogen molecule moving from the gas phase through the liquid phase to the catalytic site of the catalyst particle.

Additionally, thin film resistive heaters and temperature sensors may be incorporated directly in the microfabricated chemical reactors of the present invention. The mass transfer rates in these reactors have been fully characterized using the classical heterogeneous hydrogenation of cyclohexene to cyclohexane using a standard $Pt/Al_2O_3$ catalyst powder. An assessment of the overall mass transfer coefficient yields values that are 100 times larger than values reported for conventional laboratory reactors. FIG. 14 depicts the stoichiometric equation for the hydrogenation reaction of cyclohexene and reaction rate equation including the controlling mass transfer effects and a graphical depiction of the mass transfer of a hydrogen molecule moving from the gas phase through the liquid phase to the catalytic site of the catalyst particle.

Figure 15:
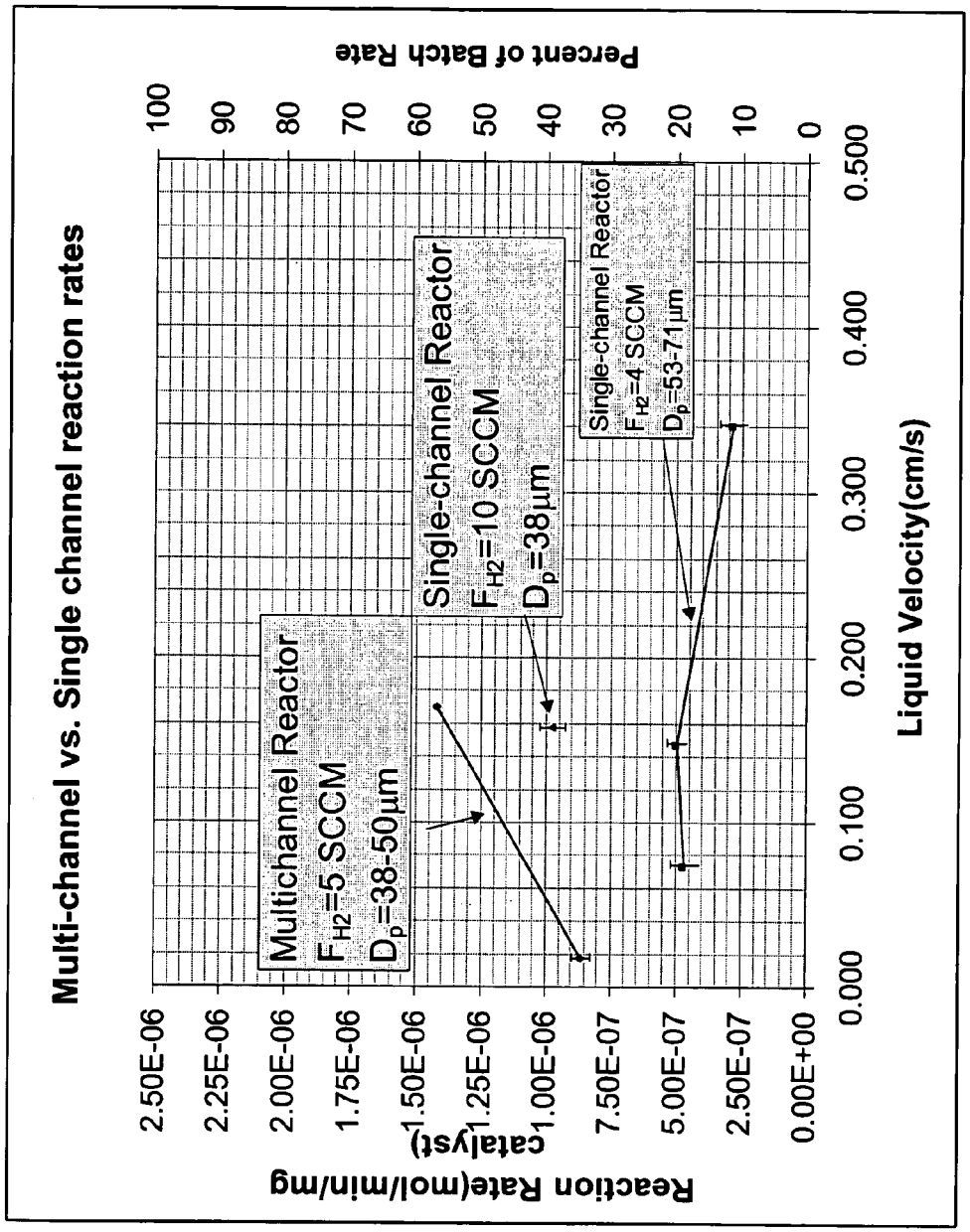
FIG. 15 is graphical plot of the reaction rate (mol/min/mg of catalyst) versus liquid velocity (cm/s) for (i) a multiple channel reactor with 5 standard cubic centimeters per minute (SCCM) flow of hydrogen and catalysts particles having diameters in the range of 38 to 50 µm; (ii) a single channel reactor with 10 standard cubic centimeters per minute (SCCM) flow of hydrogen and catalyst particles having diameters of about 38 µm; and (iii) a single channel reactor with 4 standard cubic centimeters per minute (SCCM) flow of hydrogen and catalyst particles having diameters of about 53 to 71 µm.

FIG. 15 is graphical plot of the reaction rate (mol/min/mg of catalyst) versus liquid velocity (cm/s) for (i) a multiple channel reactor of the present invention operated with 5 standard cubic centimeters per minute (SCCM) flow of hydrogen and catalysts particles having diameters in the range of 38 to 50 μm; (ii) a single channel reactor of the present invention operated with 10 standard cubic centimeters per minute (SCCM) flow of hydrogen and catalyst particles having diameters of about 38 μm; and (iii) a single channel reactor of the present invention operated with 4 standard cubic centimeters per minute (SCCM) flow of hydrogen and catalyst particles having diameters of about 53 to 71 μm. The results show that the reaction rate as measured per mass of catalyst is slightly better for the multichannel microfabricated chemical reactor than the microfabricated reactors with only a single reaction channel. Therefore, catalyst utilization is at least as high for the multichannel reactor as the single channel reactor.

Figure 16A:
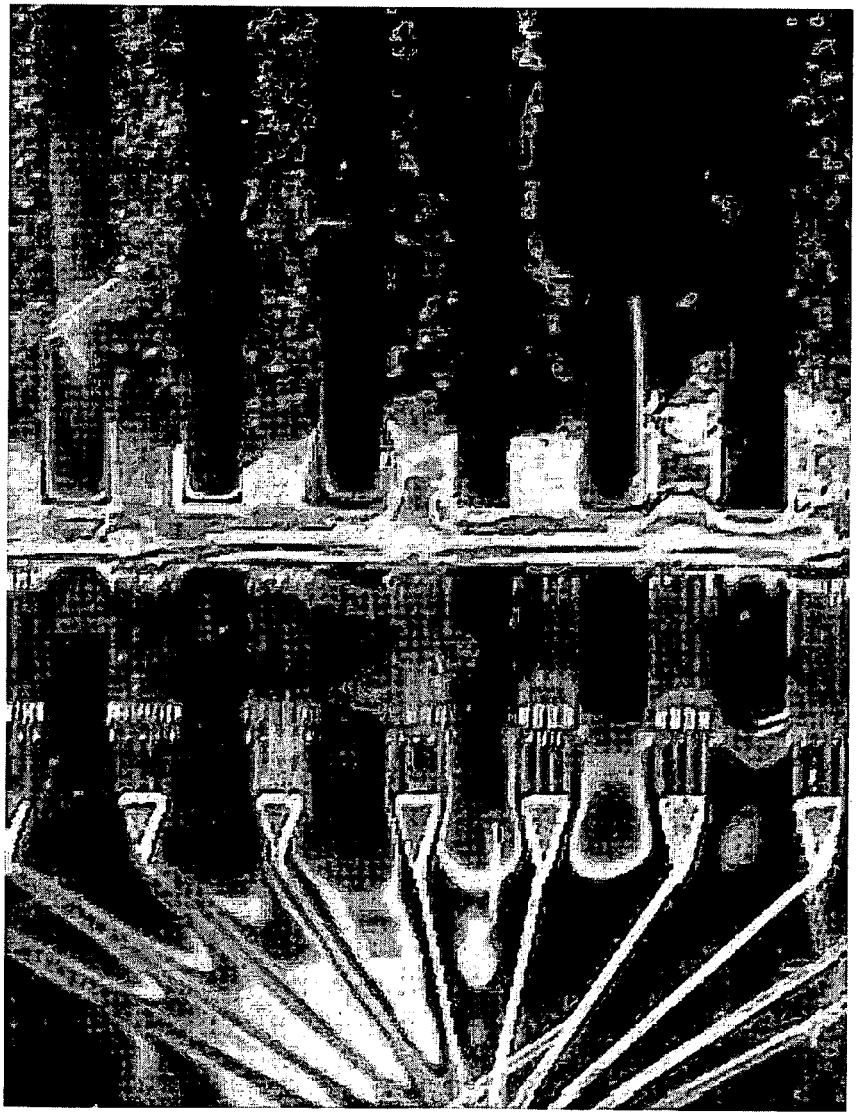
FIG. 16(a) is a photomicrograph of the inlet distribution channels and the inlet microfluidic manifold of a multiple channel microfabricated chemical reactor constructed according to the present invention and including loosely packed 50 µm particles under conditions resulting in poor distribution and channeling.
Figure 16B:
FIG. 16(b) is a photomicrograph of the inlet distribution channels and the inlet microfluidic manifold of a multiple channel microfabricated chemical reactor constructed according to the present invention and operated under conditions resulting in even distribution of the solid and liquid components.
Figure 16C:
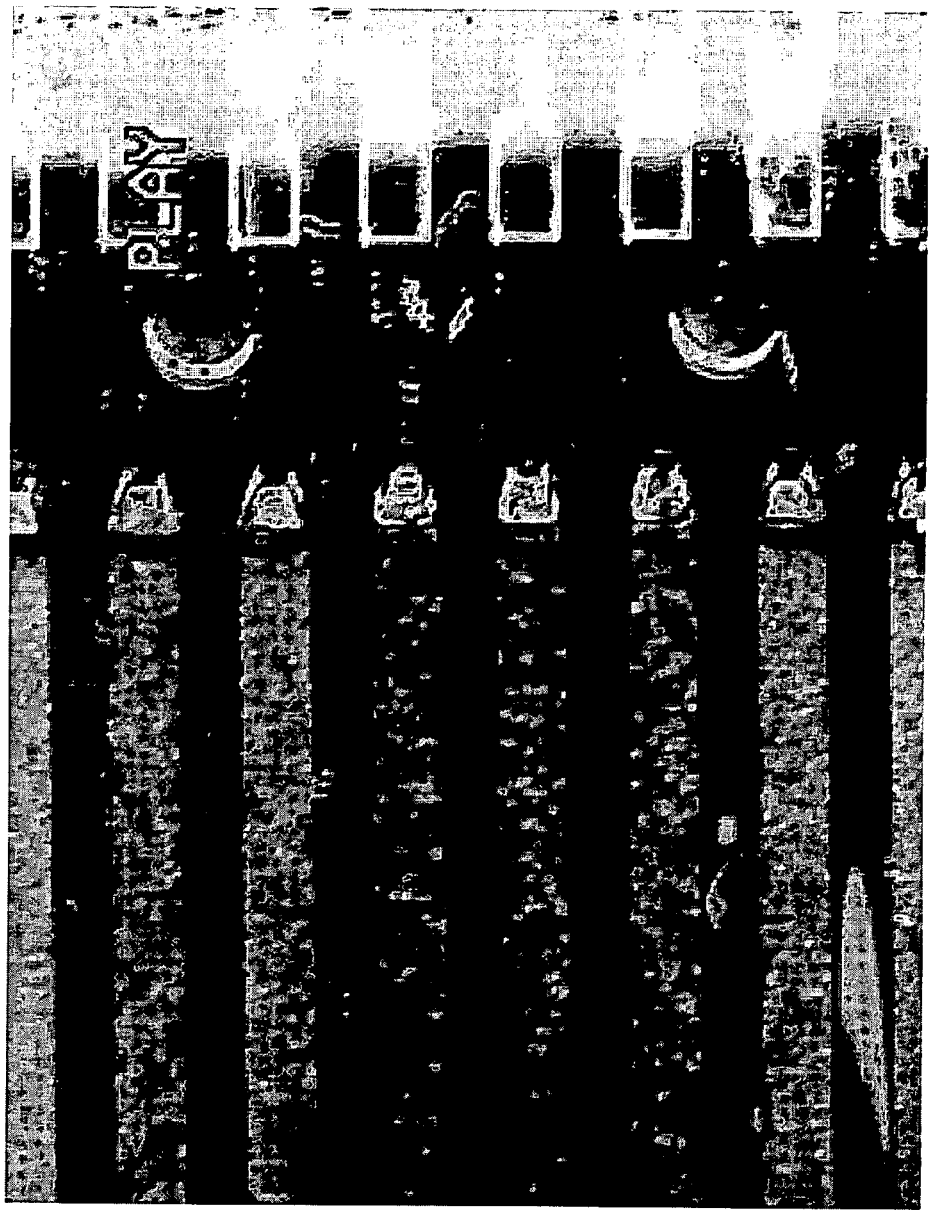
FIG. 16(c) is a photomicrograph of the outlet end, including the particle filters, of a multiple channel microfabricated chemical reactor constructed according to the present invention and operated under conditions resulting in even distribution of the solid and liquid components.

FIG. 16(a) is a photomicrograph of the inlet distribution channels and the inlet microfluidic manifold of a multiple channel microfabricated chemical reactor constructed according to the present invention with loosely packed 50 μm particles and operated under conditions resulting in poor distribution and channeling. FIG. 16(b) is a photomicrograph of the inlet distribution channels and the inlet microfluidic manifold of a multiple channel microfabricated chemical reactor constructed according to the present invention and operated under conditions resulting in even distribution of the solid and liquid components. FIG. 16(c) is a photomicrograph of the outlet end, including the particle filters, of a multiple channel microfabricated chemical reactor constructed according to the present invention and operated under conditions resulting in even distribution of the solid and liquid components.

Figure 17:
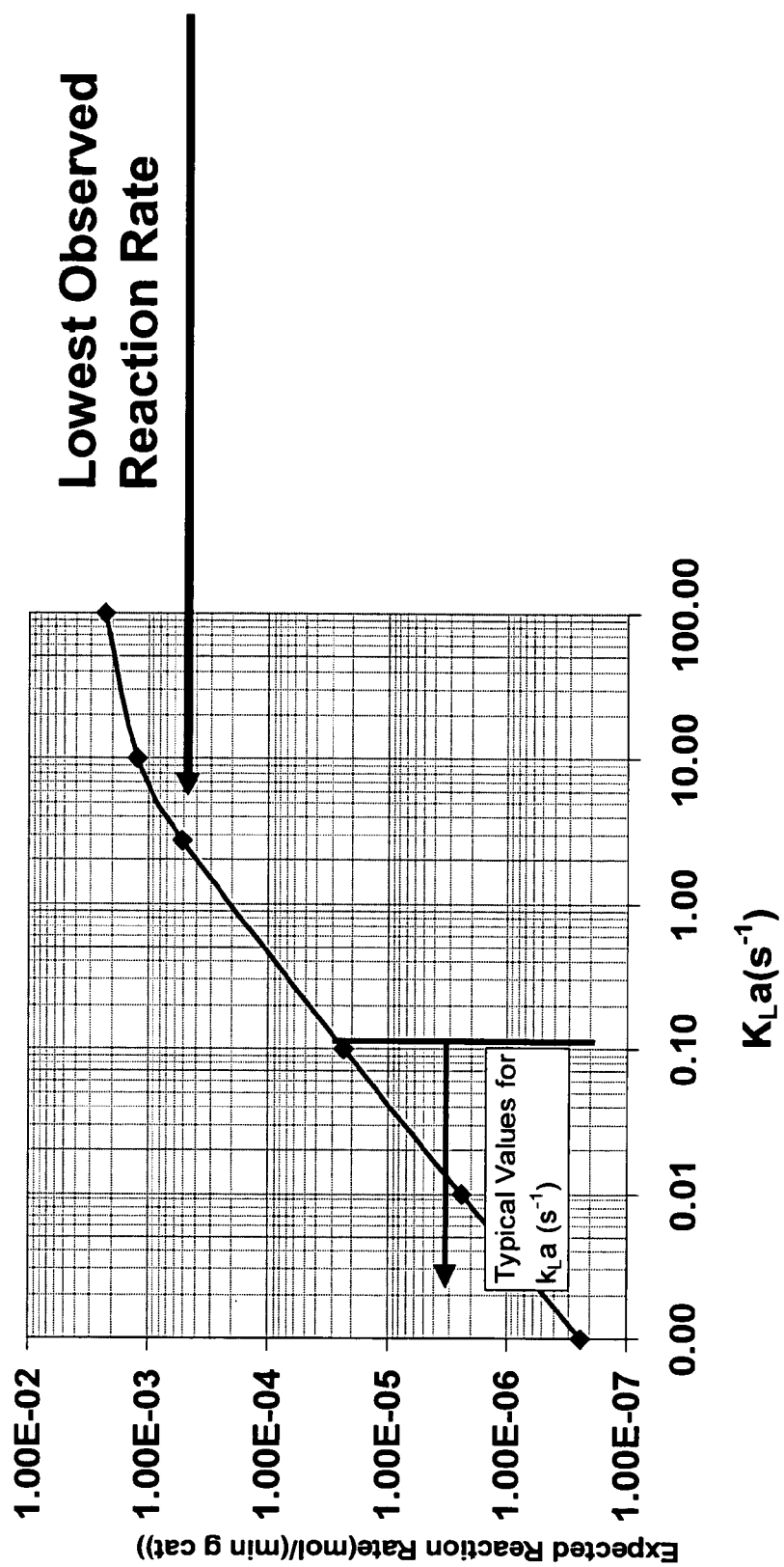
FIG. 17 is a graphical plot correlating the expected reaction rate (mg/min/mg of catalyst) with the mass transfer coefficient, Kla ($s^{-1}$) according to the reaction rate equation, Rate=$[H_2]_{sat}/(1/Kla_i+1/\eta k)$, indicating the lowest observed reaction rate for an embodiment of the microfabricated chemical reactor for the hydrogenation of cyclohexene.

FIG. 17 is a graphical plot correlating the expected reaction rate (mg/min/mg of catalyst) with the mass transfer coefficient, Kla ($s^{-1}$) according to the reaction rate equation, Rate=$[H_2]_{sat}/(1/Kla_t+1/\eta k)$, indicating the lowest observed reaction rate for the hydrogenation of cyclohexene carried out in a microfabricated chemical reactor constructed according to the present invention.

Figure 18:
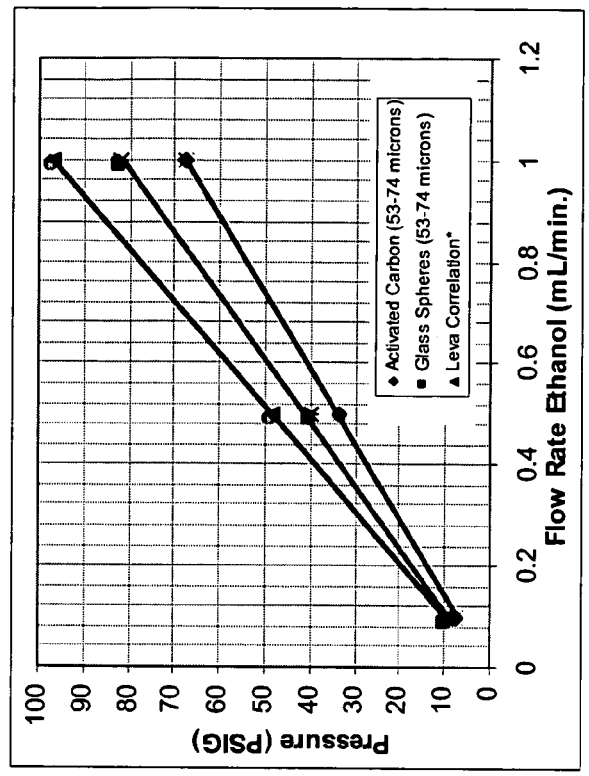
FIG. 18 is a graphical plot of the pressure drop (psi) versus the flow of ethanol (mL/min) through an embodiment of a packed bed microfabricated chemical reactor constructed according to the present invention and packed with activated carbon particles having diameters in the range of 53–74 µm, glass spheres having diameters in the range of 53–74 µm and the pressure drop predicted by the Leva's correlation for pressure drop in packed beds (Re'<10)
Figure 18:
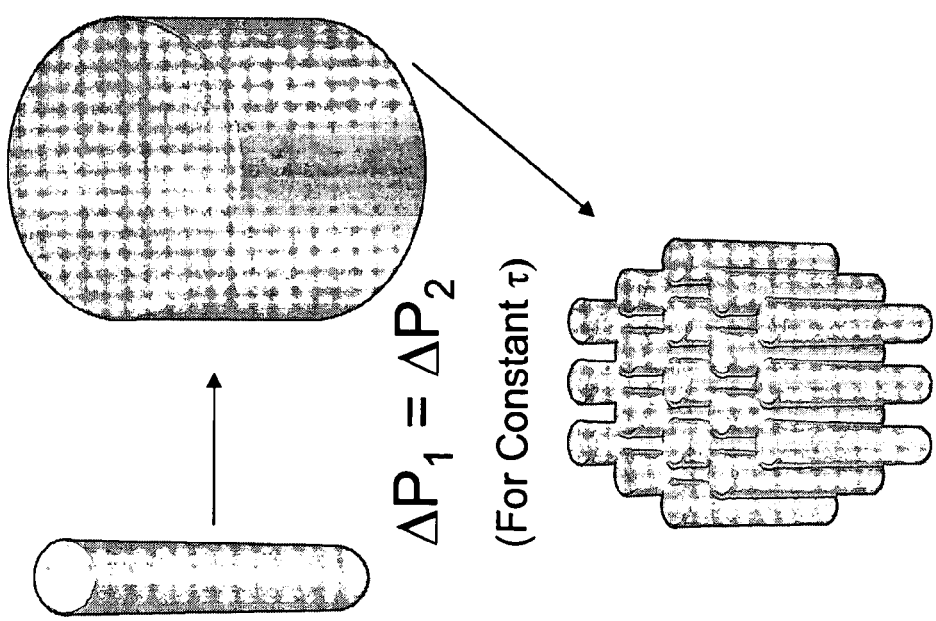

FIG. 18 is a graphical plot of the pressure drop (psi) versus the flow of ethanol (mL/min) through an embodiment of a packed bed microfabricated chemical reactor constructed according to the present invention. The three curves shown in FIG. 18 correspond to a reactor packed with activated carbon particles having diameters in the range of 53–74 μm and a reactor packed with glass spheres having diameters in the range of 53–74 μm. A third curve shows the pressure drop predicted by the Leva's correlation for pressure drop in packed beds (Re'<10). The measured pressure drop agrees with the correlation for packed bed reactors such as Ergun's equation or Leva's equation with Re'<10. These correlations depend strongly on the void fraction, shape and distribution of the particles and the loading procedure.

Figure 19:
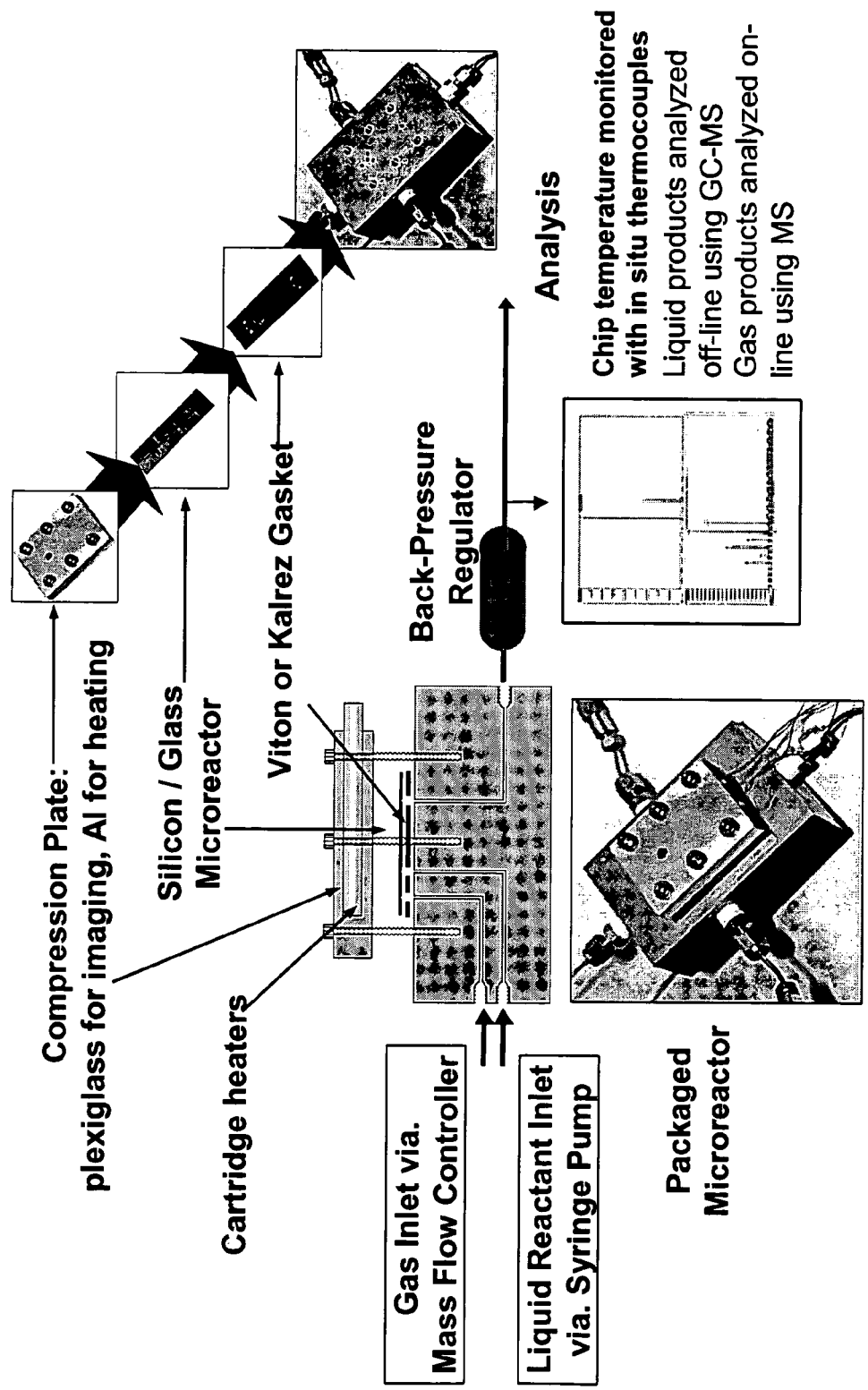
FIG. 19 depicts a method of microfabricated chemical reactor packaging and setup for an embodiment of the present invention including a plurality of lamina.

FIG. 19 depicts a reactor packaging and set up for an embodiment of a microfabricated reactor assembly constructed according to the present invention. The assembly includes a block including a gas inlet fed through a mass flow controller, a liquid reactant inlet fed through a syringe pump, and an outlet to which is connected a back-pressure regulator. A silicon/glass micro-reactor constructed according to the present invention and a Vitron or Kalrez gasket are secured on the block by a compression plate and fasteners.

The compression plate may be Plexiglas for imaging the reaction on the micro-reactor or aluminum for heating. A cartridge heater may be mounted in the compression plate. Chip temperature is monitored with in situ thermocouples. Liquid products are analyzed off-line using GC-MS. Gas products are analyzed on-line using MS. A photograph of the packaged micro-reactor is also shown in FIG. 19.

Figure 20:
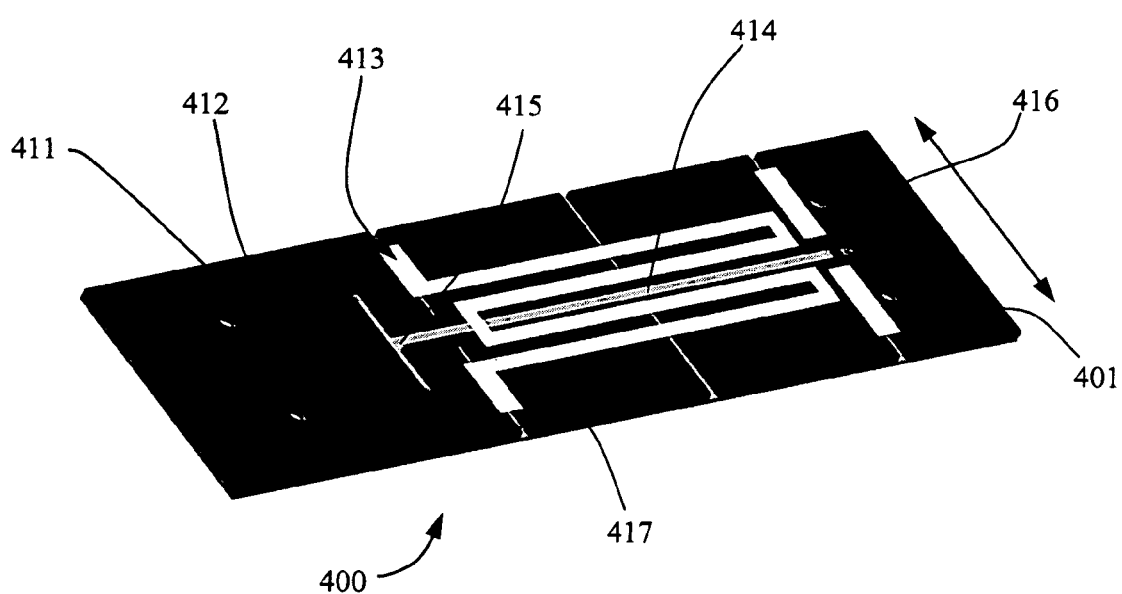
FIG. 20 is a schematic representation of a single-channel microfabricated chemical reactor constructed according to the present invention in a silicon chip.
Figure 23:
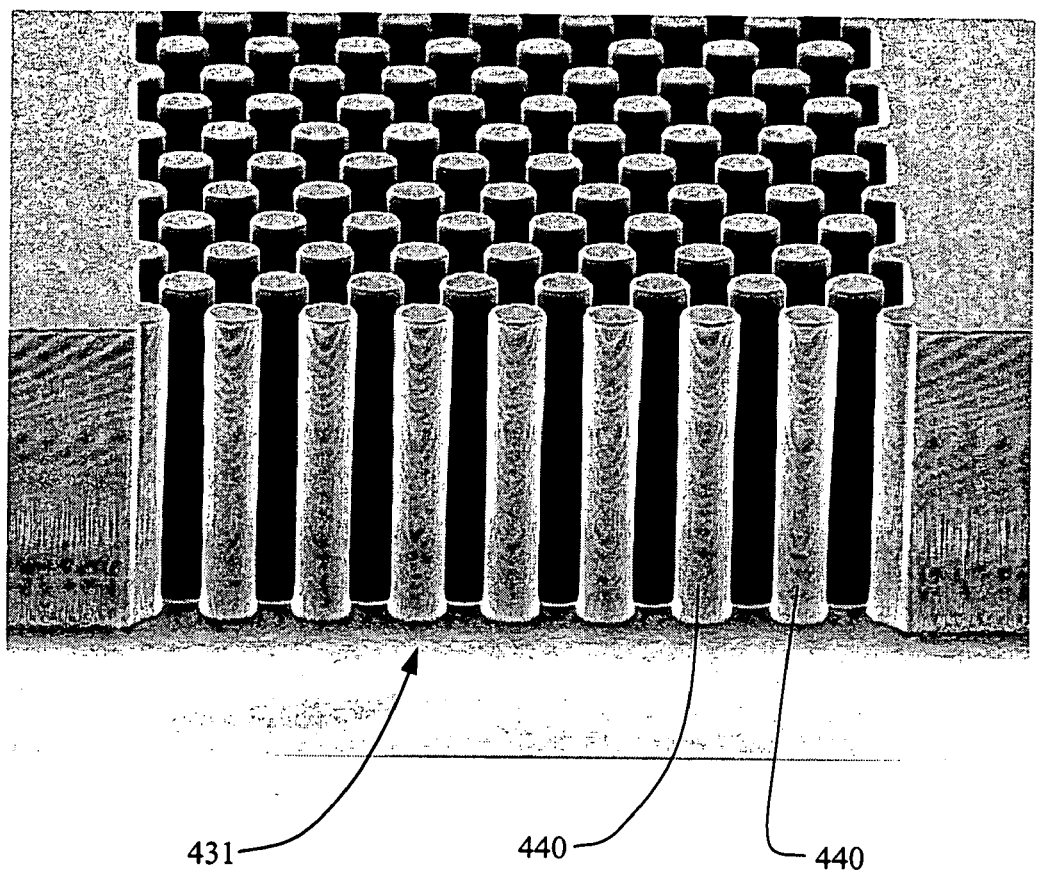
FIG. 23 is a photomicrograph of the inlet of the reaction channel of a microfabricated chemical reactor constructed according to the present invention with integral microstructured catalyst supports formed directly in the reaction channels.

The design of the microfabricated chemical reactor of the present invention was in part motivated to provide a reactor incorporating the catalytic solid-phase, means for assuring dispersion of the gas and liquid phases, and minimization of pressure drop. A microfabricated chemical reactor of the present invention providing these features is depicted in FIG. 20. The microfabricated chemical reactor of FIG. 23 is designed to incorporate standard porous catalyst particles. A disadvantage of standard porous catalyst particles is that the rate of diffusion increases as the catalyst particles or pellet size increases. Advantages of using standard catalysts, such as noble metals supported on inert porous materials, are that they are readily available and established information on chemical kinetics using the materials also is readily available.

Figure 21:
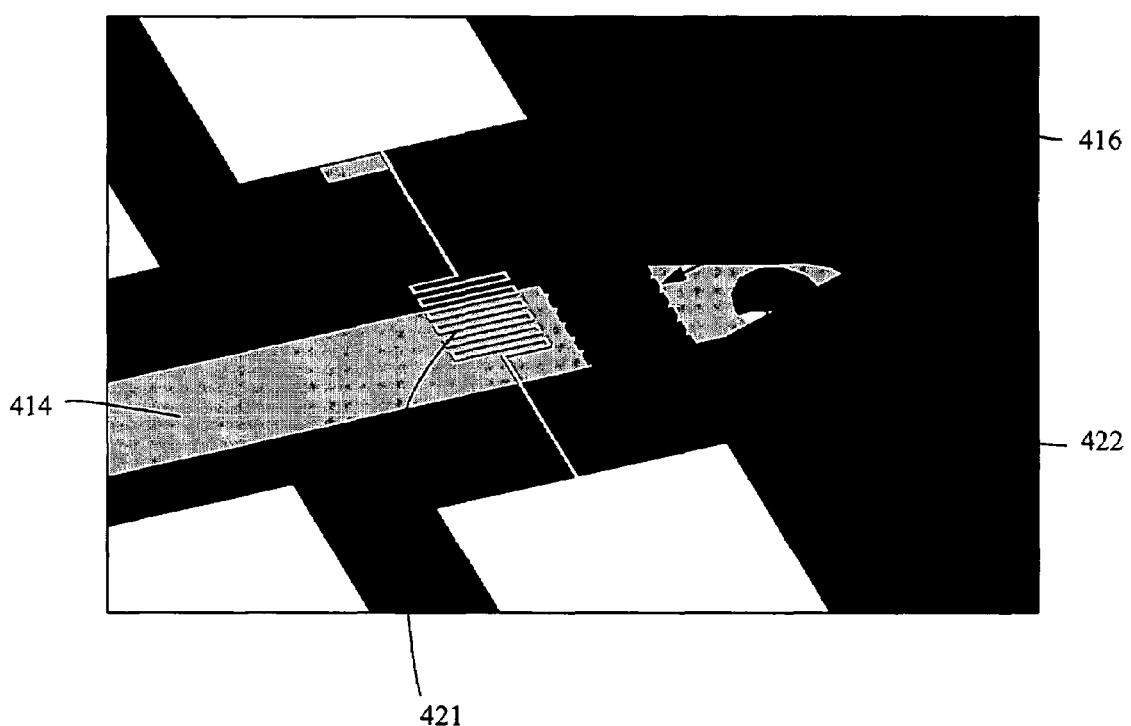
FIG. 21 is a schematic representation of the outlet end of the single-channel microfabricated chemical reactor of FIG. 20 showing the resistance temperature detector located near the end of the reaction channel.

The microfabricated chemical reactor 400 shown in FIG. 20 includes a single reaction channel and is fabricated using conventional techniques on a silicon chip 410. A thin platinum film resistor 413 covers the length of either side of the reaction channel 414 and is used to heat the chip 410 and the reactor contents. The microfluidic design includes two main parts, the inlet microfluidic manifold 414 that feeds the reaction channel 414, and the particle filter 416 at the output end of the reaction channel 414. Gas inlet 411 and liquid inlet 412 flows are split among several channels (25 $\mu$m wide) and are interleaved and then enter the 625 $\mu$m wide reaction channel 414. The interleaved arrangement of the reactant inlet channels may be as described above in connection with FIGS. 1 and 2. Two 400 $\mu$m wide particle inlet channels 417 used to deliver catalyst slurry to the reaction channel 414 are disposed perpendicular to the reactant inlet channels and the reaction channel 414. A particle filter 416 defined by a series of posts etched in the silicon chip at the outlet of the 2 cm long reaction channel 414 retains the packing material within the channel. FIG. 21 illustrates the placement of a thin film resistive temperature sensor 421 near the outlet port 422 of the reactor channel 414.

Figure 22:
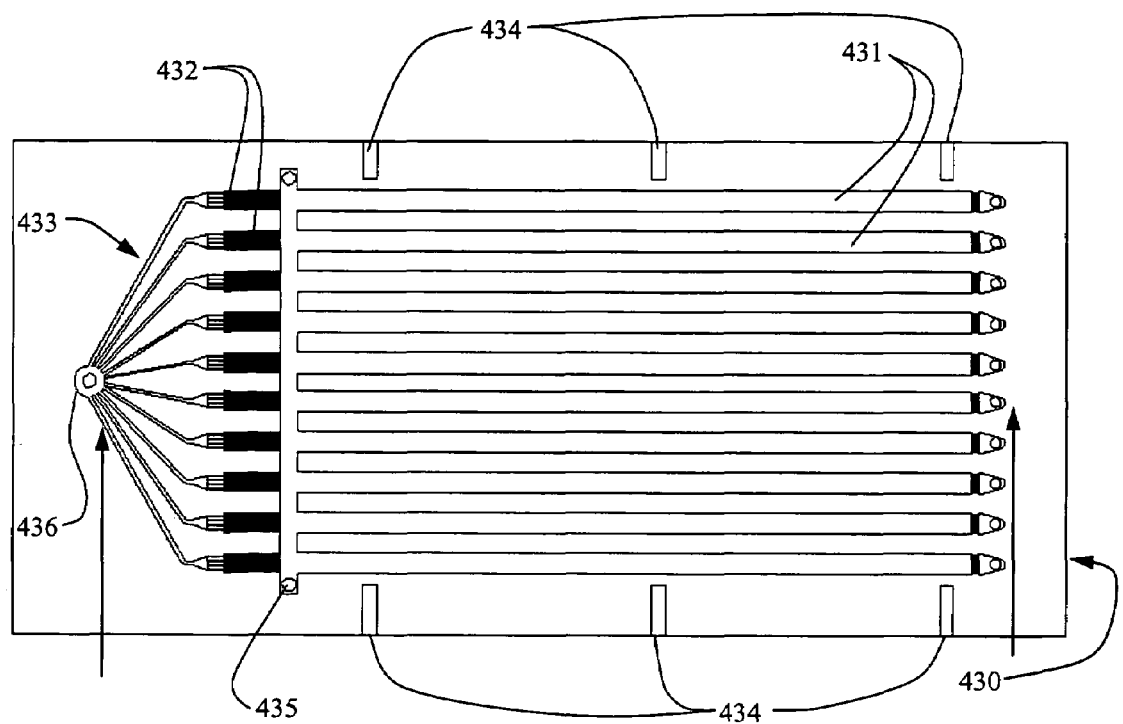
FIG. 22 is a schematic representation of a multiple-channel microfabricated chemical reactor constructed according to the present invention and including ten reaction channels.

FIG. 22 is a schematic representation of a multiple channel microfabricated chemical reactor 430 in which ten reaction channels 431 and gas-liquid inlets 432 are provided in parallel. In this embodiment, the fluid manifolds are constructed on-chip, the gas fluid distribution channels 433 are on the same silicon layer as the reaction channels 431, and the liquid distribution channel is on a second silicon layer (not shown) beneath the first silicon layer.

An embodiment of a micro-reactor fabrication process according to the present invention involves several photolithographic and etch steps, a silicon fusion bond, and an anodic bond. The inventors carried out the process as follows. Several fluid channels were formed in a silicon substrate (100 mm diameter, 500 $\mu$m thick) by using a time-multiplexed inductively coupled plasma etch process. The depth was controlled by timing the etch to approximately 300 $\mu$m. The wafer was then patterned and etched from the back-side to create ports to access the various channels. A second silicon wafer containing the fluidic manifolds was processed in a similar manner. Optionally, protective films (silicon dioxide, silicon nitride) may be grown on the silicon wafers in order to protect against aggressive reagents that could react with silicon. The two silicon wafers were aligned and fusion bonded. To form the heaters and temperature sensors, thin platinum films of approximately 0.1 $\mu$m were deposited onto a glass wafer and patterned using a "lift-off" process. The final step in the process was to cap the channels on the first layer with the glass wafer containing the metallization using an anodic bond. From a 100 mm silicon wafer, eight individual multichannel microfabricated chemical reactors (size 2 cm×4 cm×0.5 mm) or twelve single channel microfabricated chemical reactors may be obtained.

As shown in FIGS. 6 and 19, to form the fluid seals, the silicon-glass reactor was compressed against a thin elastomeric sheet, which may be, for example, 0.08 cm thick Viton, to form a fluid-tight connection to the stainless steel base that was machined for standard high-pressure fittings. The cover plate that compresses the chip may be, for example, aluminum 64 or Plexiglas for visualization. Again referring to FIG. 22 thermocouples (for example, 0.25 mm, type K, Omega) may be inserted into 400 $\mu$m channels 434 of the microfabricated chemical reactor 430. A mass flow controller, such as a Unit Systems controller, may deliver hydrogen gas to gas inlet 436, and the gas is distributed to the gas-liquid inlets 432 by manifold 433. A syringe pump, such as Harvard Apparatus PHD2000, may deliver liquid reactant to the gas-liquid inlets 432. Fractions of the effluent from the reactor fabricated in this fashion were collected and analyzed off-line using a Hewlett-Packard 6890 GC with a mass selective detector.

Various particle sizes of powder catalysts were separated using standard sieving equipment. The 50–75 $\mu$m fraction was retained and a slurry formed using ethanol. The slurry was delivered to the microreactor using the larger 400 $\mu$m wide side channels 435 shown in FIG. 22. Once the reaction channels 431 were loaded with catalyst, the catalyst inlets 135 are closed off by either substituting a different gasket or capping the external fittings.

The hydrogenation of cyclohexene was used as a model reaction to measure the mass transfer rate of the microfabricated chemical reactor 430. Cyclohexene was purified and stored in a nitrogen glove-box in order to prevent deactivation of the catalyst. The catalyst employed was a standard platinum supported on alumina powder, with a platinum content of either 1 or 5% by weight. The metal surface area for the 1 weight % Pt/Al$_2$O$_3$ catalyst was measured as 0.57 m$^2$/g using CO chemisorption in a Micromeritics ASAP 2010 instrument. The catalyst powder was sieved and fractions of 53–75 $\mu$m, 36–38 $\mu$m, or <36 $\mu$m were used. The amount of catalyst in the reactor was determined by the weight of the reactor before and after loading. A typical catalyst weight for the ten-channel microfabricated reactor 430 was 40 mg. Reactions were performed at room temperature, with the pressure varying from 0.101 MPa to 0.25 MPa, depending on flow rates. Flow visualization was used to ensure that steady co-current flow was achieved and that distribution of the fluid to the catalyst particles was even. The intrinsic reaction rates were estimated based on reported literature values and characterization of the catalyst. To ensure that the reaction kinetics were zero order with respect to cyclohexene, the cyclohexene was fed in excess. The liquid feed was pure cyclohexene, and conversions to cyclohexane were kept at approximately 10%. Therefore, the kinetics were zero order with respect to the concentration of cyclohexene and first order with respect to hydrogen.

The oxidation of benzylalcohol to benzylaldehyde also was performed, but in a single channel microreactor constructed according to the present invention, such as reactor 400 of FIG. 20. The gas phase consisted of pure molecular oxygen while the liquid phase contained pure benzylalcohol. The catalyst used was a 30 weight % palladium supported on activated carbon, while the particle size used was 53–75 $\mu$m. Pressures as high as 8 atmospheres and temperatures as high as 140° C. were employed. Reaction rates and selectivities were compared to results obtained in a miniature batch reaction vessel.

RESULTS AND DISCUSSION

In traditional laboratory reactors involving multiple phases, the behavior of the multiphase fluid flow, as influenced by relative physical properties and flow velocities, can have a substantial effect on the performance of the reactor. Various flow regimes can exist ranging from bubbling flow to pulsing flow. Flow regimes in microfabricated reactors constructed according to the present invention have been characterized visually using optical microscopy. For low liquid and gas velocities, bubbles form at the distributor and are carried by the liquid to the fixed-bed. When the flow rates become sufficiently high, the liquid wets the walls of the channel prior to the fixed bed and a stable gas-liquid interface develops in the reaction channel. For a given liquid flow rate, as the gas flow rate increases, the gas-liquid interface near the distributor begins to oscillate in a pulsing fashion. Though it has been shown that operating in a pulsing flow regime can improve performance, for all of the experimental kinetic data reported here, the reactor was operated in the steady co-current flow regime.

For the cyclohexene hydrogenation, conversions near 10% at liquid flow rates near 0.1 mL/min yielded observed reaction rates ranging from $0.9\times10^{-3}$ to $1.4\times10^{-3}$ mol/(min. g cat.), depending on the flow rates of the gas and liquid streams. The intrinsic reaction rate was estimated as $3.4\times10^{-3}$ mol/(min. g cat.) from reported literature values and the measured metal surface area. In general, the reaction rate, corrected for differences in pressure, was observed to increase as the flow rate of either the gas or liquid was increased. See FIGS. 10(a) and (b). This suggests that mass transfer limitations play a role in the observed kinetics. In traditional laboratory reactors, mass transfer coefficients vary with the liquid Reynolds number even when the Reynolds number is small. A typical Reynolds number for these experiments is Re=0.05. For the benzylalcohol oxidation, conversions near 70% were obtained at flow rates of 20 mg/min of the benzylalcohol. Such reaction rates represent a ten-fold increase over those afforded by the mild conditions usually employed on a laboratory scale.

Standard mass transfer analysis for multiphase reactions expresses the overall reaction rate in terms of the saturated solubility of hydrogen in the liquid $C_{H2(l)}$, the intrinsic reaction rate constant k, and a sum of the mass transfer resistances:

$$\text{Rate} = \frac{C_{H_2(l)}}{\frac{1}{k_l a_i} + \frac{1}{k_c a_s} + \frac{1}{\eta k}} \quad (1)$$

This thin-film model approach was applied to the tested microfabricated reactor in order to be able to compare the performance of the microreactor with that of macro-scale fixed-bed multiphase reactors. The mass transfer resistances consist of gas absorption into the liquid ($k_l a_i$), diffusion of the dissolved gas from the bulk liquid to the catalyst surface ($k_c a_s$), and diffusion of the species inside the porous catalyst (as represented by the effectiveness factor, $\eta$). Since the gas-phase consists of pure hydrogen in these experiments, resistances within the gas phase can be considered negligible compared to the liquid phase. In a majority of cases, the gas-liquid absorption resistance is the predominant resistance. Often $k_l a$ and $k_c a$ are lumped together into an overall mass transfer coefficient $K_L a$, which is used to evaluate the performance of a given reactor. The ability of a given reactor to maintain a well dispersed gas-liquid mixture is reflected in the interfacial contact area and ultimately in the mass transfer coefficient $K_L a$ value. At any given set of flow rate conditions, the reactor's $K_L a$ value can be solved for by measuring the rate of reaction, measuring the intrinsic reaction rate, and estimating the effectiveness factor from the Thiele modulus.

Alternatively, a lower bound can be placed on the mass transfer coefficient by assuming that the reaction is infinitely fast and that the process is entirely gas-liquid absorption mass transfer limited. Under these limiting conditions the observed rate is $$R_{obs} = R_A = K_L a \cdot C_{H2}^{SAT}$$

In actuality, diffusion within the porous catalyst may be a significant portion of the resistance, causing the value of $K_L a$ by this approach to be underestimated. In addition, the reaction kinetics are based on the total volume of the packed channel, as opposed to the liquid volume hold up, which further underestimates the value of $K_L a$. Table 1 lists the range of values for $K_L a$ in the microreactor using the two approaches along with values reported in the literature for laboratory trickle-bed reactors.

| | $K_L a (s^{-1})$ | Absorption Rate Kinetic Rate |
|---|---|---|
| Microreactor | 5–15 | 1.0 |
| Microreactor, lower bound analysis | 2–6 | |
| Laboratory scale trickle-bed reactor | 0.01–0.08 | 0.01 |
| Laboratory scale batch vessel | 0.01–0.7 | 10.0 |

The mass transfer coefficient for gas-liquid absorption, KLa, has been measured in a microchemical device using heterogeneously catalyzed multiphase reactions. Using the hydrogenation of cyclohexene over a supported platinum catalyst, values for the $K_L a$ ranged between 6 and $15s^{-1}$. This rate of gas-liquid mass transfer represents more than a 100-fold increase compared with values reported for traditional multi-phase fixed-bed reactors. In addition, the ability to perform oxidation reactions under more aggressive reaction conditions represents an improvement over standard laboratory equipment. The microfluidic construction of the reactor allows for the controlled distribution of gas and liquid reagents over small catalyst particles in a parallel channel arrangement. In addition to the improved mass transfer, as observed for the gas-liquid-solid cyclohexene hydrogenation, the device provides the opportunity to incorporate standard catalytic methods into a microreaction process. The ability to immobilize heterogeneous catalytic particles into a silicon chip represents an advance that could more efficiently integrate silicon sensor technology with standard chemical reaction processes. For reactions that are limited by mass transfer effects, as is the case with many multiphase reactions, the improvement in mass transfer offered by microreactors of the present invention translates into improved overall reaction rates and reactor performance.

EXAMPLE 3

As seen in FIG. 22 an array of 10 reaction channels 431 may be fabricated in silicon and may be connected through an array of on-chip microfluidic distribution channels. The gas inlet 436 may pass through a manifold 433 comprising 10 channels having widths that vary depending on the length to ensure an even distribution of flow to each reaction channel 431. The liquid inlet is split among the channels in a layer below the first layer that is depicted in FIG. 22 and meet the gas inlets in an interleaving fashion to provide a microfluidic manifold, an embodiment of which is shown in FIGS. 1 and 2. The reaction channels of reactor 430 are 2 cm long and 600 $\mu$m wide. The ten reaction channels 431 of reactor 430 contain integrated catalyst support structures 440, as seen in the photomicrograph of FIG. 23, that are posts 50 $\mu$m in diameter and 300 $\mu$m tall, and which are arranged in a staggered array. The void fraction of a catalyst of this design is 60%. Compared with packed-beds, which for spherical packing have a void fraction of 40%, the microstructured reaction channels shown in FIG. 23 have a significant reduction in pressure drop with only a small reduction in catalyst volume as compared to standard. The geometry of the structures 440, including their cross-section and spacing, was chosen for simplicity and ease of fabrication. Any other geometry could be used as integral catalyst support structures, such as for example, square, diamond, teardrop, or triangular post shapes. A denser arrangement of support structures could also be possible, and the arrangement of catalyst support structures is only limited by limitations of the microfabrication techniques utilized. These micromachined features, in conjunction with the gas-liquid inlet distributors and the microfluidic manifold, serve to provide a high surface area for improved gas-liquid contacting.

The process of fabricating the catalyst support structures involved multiple photolithographic and etch steps, and an anodic bond. A silicon nitride film, 5000 angstroms thick, was deposited onto silicon wafers to serve as a mask during the porous silicon forming process that created the support structures. The silicon nitride film was patterned and etched to expose the silicon substrate (100 mm diameter, 500 $\mu$m thick). The fluid channels were then formed in the silicon substrate by using a time-multiplexed inductively coupled plasma etch process, such as the process described in *Journal of the Electrochemical Society*, 1999 146(1), 339–349. The etch depth was controlled by timing the etch to approximately 300 $\mu$m. The wafer was then patterned from the back-side to create ports to access the various channels. Optionally, a protective film of silicon dioxide may be grown on the silicon wafers in order to protect against aggressive reagents that would react with silicon. This additional protective layer formation process was performed for those reactors used in the gas-liquid reactions, but not for those portions to subsequently be converted to the porous silicon. After creating the porous silicon, the final step in the process was to cap the channels on the first layer with a Pyrex 7740 glass wafer using an anodic bond, as earlier described. From a 100 mm silicon wafer, eight multichannel reactors (15 mm×40 mm×0.5 mm) were obtained.

Numerous studies on porous silicon and its formation mechanisms have been performed, with primary interest focused on the photoluminescent properties of the porous silicon. Surface areas have been reported as high as 800 m$^2$/g, which is comparable to standard catalyst supports. To create the porous silicon in the reaction channels only, silicon nitride was used as a mask to protect the surface of the wafer. This ensured a smooth surface for the subsequent anodic bond. The procedures used for making the porous silicon are similar to those known procedures reported in the literature. See *Properties of Porous Silicon*, EMIS Data Reviews, vol. 18, 1997, which is hereby incorporated herein by reference. The patterned silicon wafers, n-type, with a resistivity of 10–20 ohm-cm, received an aluminum coating on the backside for contact, which was removed after the porous silicon was formed. Illumination was used and a current density of roughly 15 mA/cm$^2$ was applied for 10 minutes. Scanning electron photomicrographs indicated a porous layer of approximately 30 $\mu$m in thickness.

The procedures for incorporating the platinum catalyst follow standard methods of catalyst preparation. See *Heterogeneous Catalysis in Industrial Practice*, Satterfield, C. N. Krieger Publishing 1996, which is hereby incorporated herein by reference. Impregnation of the platinum catalyst was performed on an individual die by flowing the precursor solution (1 weight % H$_2$PtCl$_6$) through the reactor. After heating the reactor in air at 550° C. for 3 hours, the catalyst was reduced by flowing pure hydrogen at 300° C. for another 3 hours.

The microfabricated chemical reactor was packaged as described previously, and FIG. 6 depicts the experimental arrangement for testing the microfabricated chemical reactor. As stated above, the silicon-glass reactor is compressed against an elastomeric gasket to form fluidic seals. Pressure measurements are made external to the reactor with in-line fittings. To conduct the hydrogenation of cyclohexene, pure hydrogen is delivered with a mass flow controller and a syringe pump delivers purified cyclohexene. The effluent is collected and analyzed offline using a GC-mass spectrometer. Images of the fluid flow are collected with the aid of a stereomicroscope and a CCD camera positioned directly above the reactor.

Using the cyclohexene hydrogenation reaction as a model reaction, it was described above that mass transfer could be greatly improved in microreactors packed with catalyst particles having a 50 $\mu$m diameter. In typical laboratory reactors three-phase reactions such as the cyclohexene hydrogenation can be limited by the rate of gas absorption into the liquid, the distribution of reagents throughout the packed-bed, or by diffusion within the porous catalyst itself. An overall mass transfer coefficient, $K_L a$, was measured in a microfabricated packed-bed chemical reactor of the present invention to be 10s$^{-1}$ nearly 100 times larger than values reported for laboratory scale reactors. While packed-beds offer the convenience of using catalysts with known properties prepared by traditional methods, the devices require the extra step of filtering and loading the catalyst particles into the channels. An even distribution and packing density among the parallel channels is critical in order to get an even flow of reagents. Otherwise, the flow may bypass one or several channels, decreasing the utilization of the reactor. Furthermore, the packing density is affected by the particular mode of catalyst loading. Obtaining a repeatable packing density among several devices operated in parallel could become problematic.

In order to alleviate some of these challenges typically associated with packed-beds, the above-described microstructured reactor having porous silicon catalyst support structures 440 was created that would mimic the performance of the packed-bed while providing exact control over the bed properties. The high degree of tolerance offered by microfabrication methods ensures that each reactor has the same flow behavior.

Figure 24A:
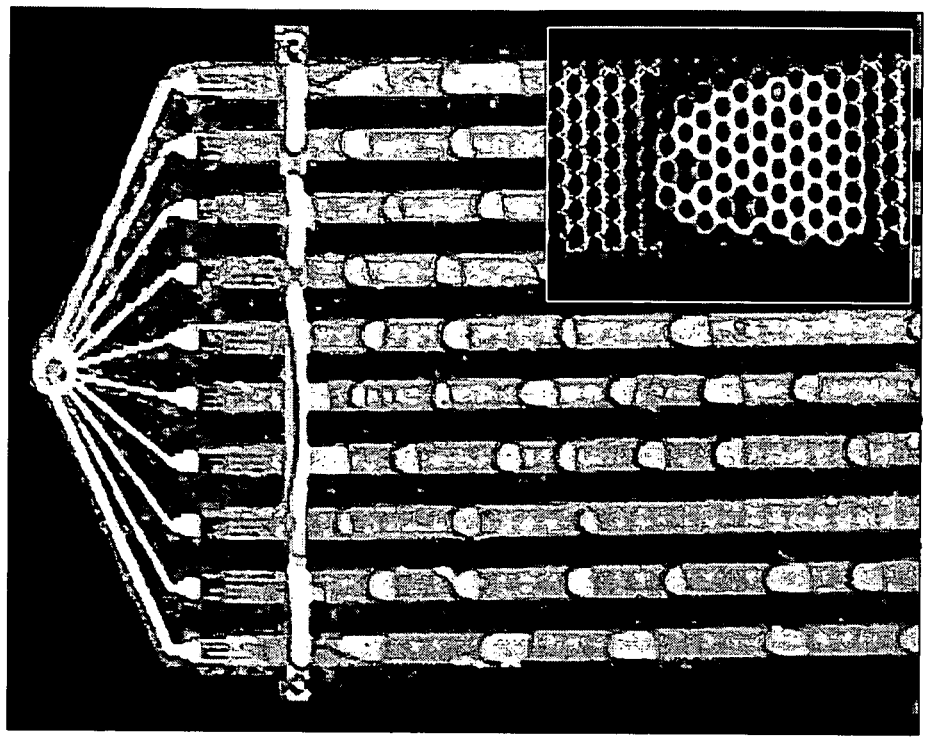
FIG. 24(a) is a photomicrograph of a region of the microfabricated chemical reactor show in FIG. 22 operated at gas flow rates whereby the gas and liquid phases are segregated, and accompanied by an enlarged microphotograph of a gas slug in the center of a reaction channel occurring under the depicted flow conditions.
Figure 24B:
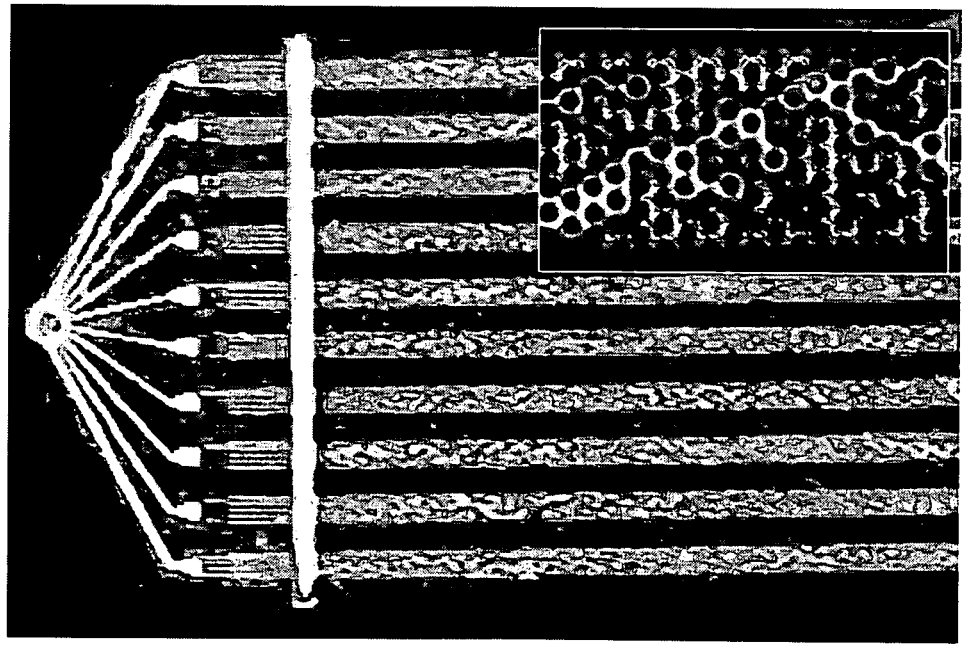
FIG. 24(b) is a photomicrograph of a region of the microfabricated chemical reactor show in FIG. 22 operated at gas flow rates whereby the gas and liquid phases are randomly dispersed throughout the microstructured channel, and accompanied by an enlarged microphotograph in which the 50 µm catalyst support structures are visible and the two phases are randomly dispersed throughout the microstructure channel of the microfabricated chemical reactor.

The nature of the two-phase gas-liquid flow across the integral catalyst support structures 440 was investigated over a range of flow rates. The nature of the flow, as well as the transition from various flow regimes, depends not only on the relative velocities of the two phases, but also on the various physical properties of the solvent, such as viscosity and surface tension. FIG. 24(*a*) is a photomicrograph of an embodiment of the microfabricated chemical reactor shown in FIG. 23 at gas flow rates in which the gas and liquid phases are segregated in the reaction channels. FIG. 24(*a*) includes an enlarged photomicrograph of a gas slug in the center of a reaction channel of the embodiment of the microfabricated chemical reactor under these flow conditions. FIG. 24(*b*) is a photomicrograph of the embodiment of the microfabricated chemical reactor show in FIG. 23 at gas flow rates in which the gas and liquid phases are randomly dispersed throughout the microstructured reaction channel. FIG. 24(*b*) also includes an enlarged photomicrograph in which the 50 $\mu$m diameter catalyst support structures are visible and the segregated flow can be seen in the reaction channel.

At relatively low gas flow rates, the predominate phase is liquid and the gas travels as slugs, or bubbles, of various sizes among the ten channels (see FIG. 24(*a*)). As the gas flow rate is increased relative to the liquid flow, streams of gas form in the center of the channels, as the liquid prefers to wet the walls of the channels.

Increasing both flow rates produces a flow regime that is characterized by a rapid dispersion of both phases (see FIG. 24(*b*)). It is in this flow regime that mixing of the gas and liquid phases is the greatest and the interfacial area is expected to be substantially larger than in an open channel arrangement.

Figure 25:
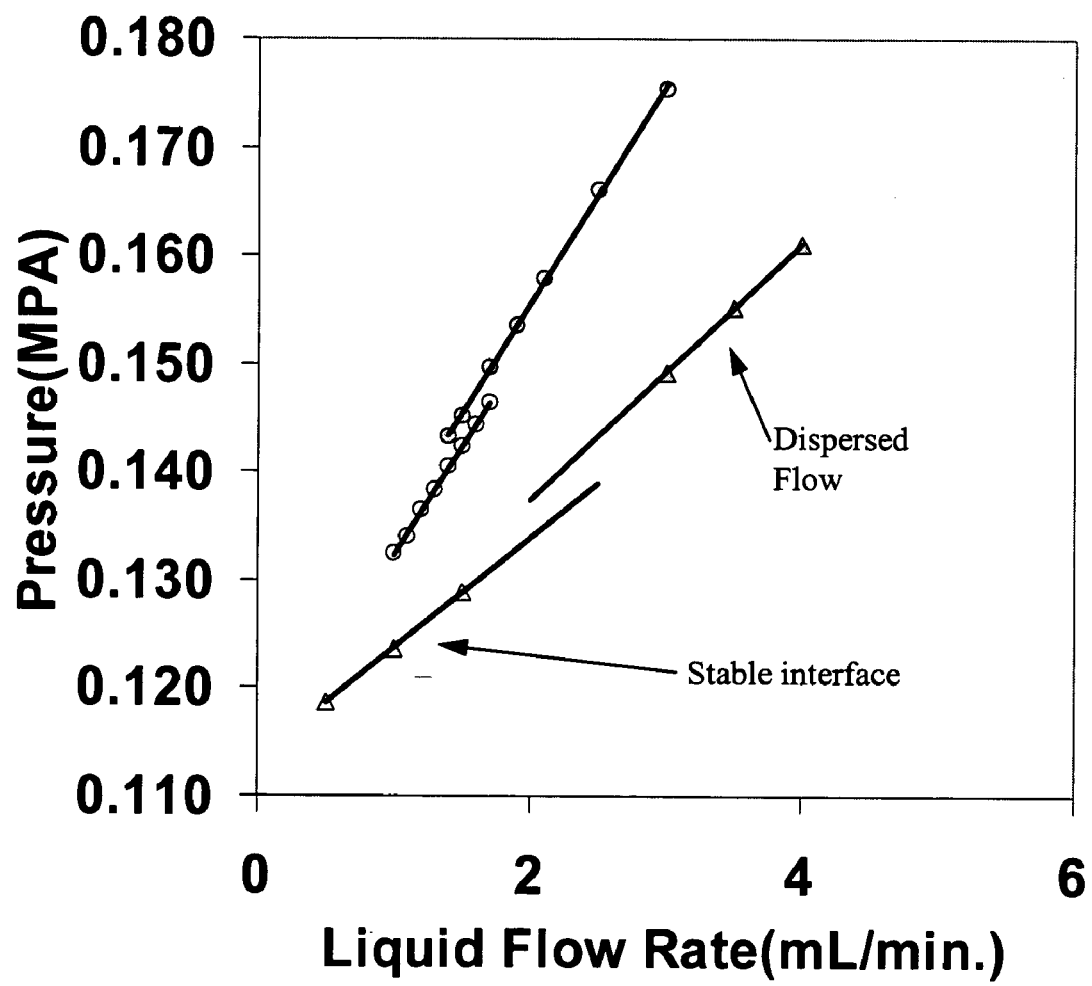
FIG. 25 is a graphical plot of the pressure drop (MPA) versus liquid flow rate (mL/min) for two phase flow through a microfabricated chemical reactor constructed according to the present invention and determined for flows of ethanol with air at 100 SCCM and toluene with air at 100 SCCM.

The multiphase pressure drop results for two different solvents are presented in FIG. 25. FIG. 25 is a graphical plot of the pressure drop (MPA) versus liquid flow rate (mL/min) for two phase flow through a microfabricated chemical reactor of the invention for flows of ethanol with air at 100 SCCM and toluene with air at 100 SCCM. The transition to the well-dispersed flow regime is noted as a shift in the pressure drop versus flow rate curve. The pressure drop is substantially less than that of the packed-bed microreactor. For comparison, in the packed-bed microreactor, a liquid flow rate of 0.1 mL/min generated pressures of 0.17 MPA. Provided the pressure versus flow dependence remains linear, then the pressure drop is 10 times lower in the microstructured reactors. Initial reaction rates for the hydrogenation of cyclohexene in the integrated catalytic microreactor were observed to be $2.0 \times 10^{-5}$ mol/min. This is nearly half that of the ten-channel packed-bed reactor.

Thus, the inventors constructed a fully micromachined microfabricated chemical reactor with integral catalyst support structures. Posts 50 $\mu$m in diameter were etched into the reaction channels of the microreactor, mimicking the arrangement of a packed bed. Procedures for creating porous silicon were used to provide a high surface area support for the metal catalyst. Such microfabrication methods allow the integration of catalyst supports or gas-liquid contacting structures directly into the reactor. This provides an additional control, as compared with a packed-bed reactor, of factors such as support size and distribution and void fraction. The construction of the microfluidic manifold and reactant distributors of the reactor allows for the controlled distribution of gas and liquid reagents to, for example, the small catalyst particles or the microstructured posts. In addition, silicon microfabrication allows the local integration of temperature sensing and control in the reactor device. For fast gas-liquid-solid reactions, such as the cyclohexene hydrogenation, the chemical kinetics can be limited by the mass transfer rate of the gaseous species through the liquid, to the surface of the catalyst. By increasing the surface area over which the gas and liquid streams must contact, the mass transfer limited reaction rates can be improved. For reactions that are limited by mass transfer effects, as is the case with many multiphase reactions, the improvement in mass transfer offered by the microreactor translates into improved overall reaction rates and reactor performance and control.

It is to be understood that the present description illustrates certain aspects of the invention relevant to a clear understanding of the invention. Certain aspects of the invention that would be apparent to those of ordinary skill in the art and that, therefore, would not facilitate a better understanding of the invention have not been presented in order to simplify the present description. Also, although the present invention has been described in connection with certain embodiments, those of ordinary skill in the art will, upon considering the foregoing description, recognize that many modifications and variations of the invention may be employed. It is intended that all such variations and modifications of the invention are covered by the foregoing description and the following claims.

We claim:

1. A microfabricated chemical reactor, comprising:
   a plurality of lamina;
   an inlet port formed in at least one said lamina;
   an outlet port formed in at least one said lamina;
   a continuous channel formed in at least one said lamina providing fluid communication between said inlet port and said outlet port; and
   a particle filter in said continuous channel and formed by one said lamina, wherein said particle filter restricts flow through said continuous channel.

2. The microfabricated chemical reactor of claim 1, wherein said particle filter is a plurality of structures disposed across said continuous channel.

3. The microfabricated chemical reactor of claim 1, further comprising:
   a plurality of solid particles disposed in said continuous channel, wherein said particle filter separates said solid particles from said outlet port.

4. The microfabricated chemical reactor of claim 1, wherein said particle filter is integral to said continuous channel.

5. The microfabricated chemical reactor of claim 2, wherein each said structures is a post.

6. The microfabricated chemical reactor of claim 5, wherein said particle filter is a series of said posts that are spaced apart to allow flow through said filter while retaining said solid particles within said reaction channel.

7. The microfabricated chemical reactor of claim 5, wherein said particle filter restricts passage of particles greater than 500 $\mu$m in diameter.

8. The microfabricated chemical reactor of claim 1, wherein said particle filter restricts passage of particles greater than 50 $\mu$m in diameter.

9. The microfabricated chemical reactor of claim 1, wherein said particle filter restricts passage of particles greater than 25 $\mu$m in diameter.

10. The microfabricated chemical reactor of claim 3, further comprising:
   a solid particle inlet formed in at least one of said lamina.

11. The microfabricated chemical reactor of claim 10, wherein said solid particles are selected form the group consisting of catalyst particles, polystyrene particles, carbon particles, polymer beads, metals supported on alumina particles, and metals supported on glass particles.

12. The microfabricated chemical reactor of claim 10, wherein said solid particles comprise platinum supported on alumina particles.

13. The microfabricated chemical reactor of claim 1, further comprising:
   a gas inlet port formed in at least one of said lamina.

14. The microfabricated chemical reactor of claim 13, further comprising:
   a plurality of feed channels providing fluid communication between said continuous channel and at least one said gas inlet port, and between said continuous channel and a liquid inlet port, and wherein said plurality of feed channels is connected to said continuous channel by a microfluidic feed manifold.

15. A microfabricated chemical reactor, comprising
   a plurality of lamina;
   a liquid inlet port formed in at least one of said lamina;
   a gas inlet port formed in at least one of said lamina;
   an outlet port defined in at least one of said lamina;
   a continuous channel formed in at least one of said lamina providing fluid communication between said liquid inlet port and said outlet port, and between said gas inlet port and said outlet port;
   a plurality of gas feed channels providing fluid communication between said continuous channel and said gas inlet port and a plurality of liquid feed channels providing fluid communication between said continuous channel and said liquid inlet port, wherein said plurality of gas feed channels is connected to said continuous channel by a microfluidic feed manifold, wherein said microfluidic feed manifold comprises an interleaved arrangement of said plurality gas feed channels and said plurality of said liquid feed channels.

16. A microfabricated chemical reactor, comprising:
   a plurality of lamina;
   an inlet port formed in at least one of said lamina;
   an outlet port formed in at least one of said lamina;
   a plurality of continuous channels formed in at least one said lamina providing fluid communication between said inlet port and said outlet port;
   at least one particle inlet formed in at least one lamina; and
   at least one particle inlet channel providing fluid communication between said at least one particle channel and said outlet port.

17. The microfabricated chemical reactor of claim 16, wherein said inlet port is in fluid communication with said plurality of continuous channels by a plurality inlet distribution channels.

18. The microfabricated chemical reactor of claim 17, wherein each of said inlet distribution channels is sized to provide even flow distribution to each said continuous channel.

19. The microfabricated chemical reactor of claim 16, comprising:
   a second inlet port defined in at least one of said lamina, wherein said plurality of continuous channels provides fluid communication between said second inlet port and said outlet port.

20. The microfabricated chemical reactor of claim 16, wherein at least a region of each of said continuous channels is packed with a plurality of solid particles.

21. The microfabricated chemical reactor of claim 16, wherein at least one of said continuous channels is packed with a plurality of first solid particles and at least another of said continuous channels is packed with a plurality of second solid particle.

22. The microfabricated chemical reactor of claim 21, wherein said first solid particle is a catalyst particle.

23. The microfabricated chemical reactor of claim 22, wherein said second solid particle is a catalyst particle that differs from said first particle.

24. The microfabricated chemical reactor of claim 22, wherein said second particle differs from said first particle in at least one property selected from particle size, porosity, catalyst composition, catalyst support composition, and catalytic activity.

25. A microfabricated chemical reactor, comprising:
   a plurality of lamina;
   a first inlet port formed in at least one of said lamina;
   a second inlet port formed in at least one of said lamina;
   an outlet port formed in at least one of said lamina; and
   a continuous channel formed in at least one of said lamina providing fluid communication from said first inlet port to said outlet port and from said second inlet port to said outlet port, wherein said first inlet port and said second inlet port are connected to said continuous channel by a microfluidic manifold, wherein said microfluidic feed manifold comprises an interleaved arrangement of a plurality gas feed channels and a plurality of said liquid feed channels.

26. The microfabricated chemical reactor of claim 25, wherein said microfluidic manifold comprises a series of interleaved inlet channels.

27. The microfabricated chemical reactor of claim 25, wherein said series of interleaved inlet channels comprises inlet channels providing fluid communication between said first inlet port and with said continuous channel, and wherein said series of interleaved inlet channels further comprises inlet channels providing fluid communication between said second inlet port and said continuous channel.

28. The microfabricated chemical reactor of claim 27, wherein said inlet channels in fluid communication with said first inlet port are interleaved with said inlet channels in fluid communication with said second inlet port.

29. The microfabricated chemical reactor of claim 25, wherein said first inlet port is provided for a gaseous reactant and said second inlet is provided for a liquid reactant.

30. A microfabricated chemical reactor, comprising:
   a plurality of lamina;
   an inlet port formed in at least one of said lamina;
   an outlet port formed in at least one of said lamina;
   a continuous channel formed in at least one of said lamina and providing fluid communication between said first inlet port and said outlet port; and
   a plurality of integral catalyst support structures formed in said continuous channel, said integral catalyst support structures supporting a catalyst.

31. A microfabricated chemical reactor adapted for conducting heterogeneous catalytic reactions with an overall mass transfer coefficient greater than 2 $\sec^{-1}$.

32. The microfabricated chemical reactor of claim 31, wherein said heterogeneous catalytic reaction involves liquid and gaseous reactants.

33. The microfabricated chemical reactor of claim 15, further comprising:
a temperature detector within said continuous channel.

34. The microfabricated chemical reactor of claim 33, further comprising:
a heating element.

35. A microfabricated chemical reactor, comprising:
a plurality of lamina;
an inlet port formed in at least one of said lamina;
an outlet port formed in at least one of said lamina;
a continuous channel formed in at least one of said lamina and providing fluid communication between said inlet port and said outlet port;
an accessory channel formed in at least one of said lamina for incorporating an accessory into the microfabricated chemical reactor.

36. The microfabricated chemical reactor of claim 35, wherein said accessory is selected from a group consisting of a temperature sensor, a pressure sensor, a heater element, a fiber optic device, and a sampling device.

* * * * *